United States Patent
Swink et al.

(10) Patent No.: US 9,172,669 B2
(45) Date of Patent: Oct. 27, 2015

(54) APPARATUS, METHODS AND COMPUTER-READABLE STORAGE MEDIA FOR SECURITY PROVISIONING AT A COMMUNICATION DEVICE

(75) Inventors: Cristy Swink, Milton, GA (US); Jason Sikes, Carnation, WA (US); Benjamin Fineman, San Francisco, CA (US); Jonathan Solis Snydal, Oakland, CA (US); Sara Louise Todd, San Francisco, CA (US); Thomas L. Rohrer, San Anselmo, CA (US); Dhana Dhanasarnsombat, San Mateo, CA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 575 days.

(21) Appl. No.: 12/903,382

(22) Filed: Oct. 13, 2010

(65) Prior Publication Data

US 2011/0088003 A1 Apr. 14, 2011

Related U.S. Application Data

(60) Provisional application No. 61/251,717, filed on Oct. 14, 2009.

(51) Int. Cl.
*G06F 3/033* (2013.01)
*H04L 12/58* (2006.01)
(Continued)

(52) U.S. Cl.
CPC ............. *H04L 51/16* (2013.01); *H04L 51/32* (2013.01); *H04M 1/7255* (2013.01);
(Continued)

(58) Field of Classification Search
CPC ........ G06F 3/016; G06F 3/0488; G06F 3/017
USPC ............... 715/702, 863; 345/173; 400/486; 455/575.1, 575.3, 575.4
See application file for complete search history.

(56) References Cited

U.S. PATENT DOCUMENTS 5,072,412 A 12/1991 Henderson, Jr. et al.
5,233,687 A 8/1993 Henderson, Jr. et al.
(Continued)

FOREIGN PATENT DOCUMENTS

WO 2008107675 9/2008

OTHER PUBLICATIONS

"Global Framework—UE Flows and Screen Details". AT&T Armstrong Project. Version 1.10. Last accessed Jun. 16, 2010, 166 pages.

(Continued)

*Primary Examiner* — Haoshian Shih
(74) *Attorney, Agent, or Firm* — Amin, Turocy & Watson, LLP

(57) ABSTRACT

Apparatus, methods and computer-readable storage medium are provided for security provisioning at a communication device. In some embodiments, a method can include: executing a high security application on a communication device based, at least, on detecting that high security is enabled for the communication device and detecting execution of a low security application; outputting, via a user interface (UI), information configured to detect an entry to the communication device; detecting an entry at the UI of the communication device; determining whether the entry corresponds to security access information stored in the communication device; and providing access to the communication device based, at least, on determining that the entry corresponds to the security access information.

20 Claims, 17 Drawing Sheets

(51) Int. Cl.
  *H04M 1/725* (2006.01)
  *H04W 4/12* (2009.01)
  *H04W 4/14* (2009.01)

(52) U.S. Cl.
  CPC ..... *H04M 1/72552* (2013.01); *H04M 1/72555* (2013.01); *H04W 4/12* (2013.01); *H04W 4/14* (2013.01); *H04L 51/28* (2013.01)

(56) References Cited

U.S. PATENT DOCUMENTS

| | | | |
|---|---|---|---|
| 5,394,521 A | 2/1995 | Henderson, Jr. et al. | |
| 5,838,326 A | 11/1998 | Card et al. | |
| 5,847,709 A | 12/1998 | Card et al. | |
| 6,269,369 B1 | 7/2001 | Robertson | |
| 6,367,020 B1 | 4/2002 | Klein | |
| 6,401,209 B1 | 6/2002 | Klein | |
| 7,269,727 B1 | 9/2007 | Mukherjee et al. | |
| 7,286,063 B2 | 10/2007 | Gauthey et al. | |
| 7,308,926 B1 | 12/2007 | Hawkins | |
| 7,322,626 B2 | 1/2008 | Thomas | |
| 7,324,333 B2 | 1/2008 | Allen | |
| 7,376,669 B2 | 5/2008 | Klein | |
| 7,443,665 B2 | 10/2008 | Allen | |
| 7,453,443 B2 | 11/2008 | Rytivaara et al. | |
| 7,478,436 B1 | 1/2009 | Sheih et al. | |
| 7,606,024 B2 | 10/2009 | Boss et al. | |
| 7,620,982 B2 | 11/2009 | Ishidera | |
| 7,628,335 B2 | 12/2009 | Morimoto et al. | |
| 7,636,033 B2 | 12/2009 | Golden | |
| 7,640,293 B2 | 12/2009 | Wilson et al. | |
| 7,657,849 B2 | 2/2010 | Chaundri et al. | |
| 7,761,814 B2 | 7/2010 | Rimas-Ribikauskas et al. | |
| 7,933,609 B2 | 4/2011 | Lagerstedt et al. | |
| 7,953,859 B1 | 5/2011 | Kiefhaber et al. | |
| 8,316,095 B1 | 11/2012 | Wheeler et al. | |
| 8,484,564 B1 | 7/2013 | Marti et al. | |
| 8,543,927 B1 | 9/2013 | McKinley et al. | |
| 8,676,901 B1 | 3/2014 | Nicolaou et al. | |
| 2001/0044903 A1 | 11/2001 | Yamamoto et al. | |
| 2002/0056046 A1 | 5/2002 | Klein | |
| 2002/0077079 A1 | 6/2002 | Ishihara | |
| 2002/0099960 A1 | 7/2002 | Klein | |
| 2002/0114654 A1* | 8/2002 | Abe | 400/486 |
| 2003/0023688 A1 | 1/2003 | Denenberg et al. | |
| 2003/0025840 A1 | 2/2003 | Arling | |
| 2003/0074575 A1 | 4/2003 | Hoberock et al. | |
| 2003/0074590 A1 | 4/2003 | Fogle et al. | |
| 2003/0120957 A1* | 6/2003 | Pathiyal | 713/202 |
| 2003/0172495 A1 | 9/2003 | Pan | |
| 2003/0184592 A1 | 10/2003 | Awada et al. | |
| 2003/0191960 A1 | 10/2003 | Hung-yi | |
| 2003/0206224 A1 | 11/2003 | Sakakibara et al. | |
| 2004/0034561 A1 | 2/2004 | Smith | |
| 2004/0046018 A1 | 3/2004 | Dobbins | |
| 2004/0082322 A1 | 4/2004 | Tani | |
| 2004/0085351 A1 | 5/2004 | Tokkonen | |
| 2004/0092247 A1 | 5/2004 | Tani | |
| 2004/0113491 A1 | 6/2004 | Mauser | |
| 2004/0113819 A1 | 6/2004 | Gauthey | |
| 2004/0123135 A1 | 6/2004 | Goddard | |
| 2004/0137884 A1 | 7/2004 | Engstrom et al. | |
| 2004/0189439 A1 | 9/2004 | Cansino | |
| 2004/0220913 A1 | 11/2004 | Walker | |
| 2005/0085215 A1 | 4/2005 | Kokko et al. | |
| 2005/0117564 A1 | 6/2005 | Vieri et al. | |
| 2005/0234910 A1 | 10/2005 | Buchheit et al. | |
| 2005/0253817 A1 | 11/2005 | Rytivaara et al. | |
| 2005/0282135 A1 | 12/2005 | Berman | |
| 2006/0012577 A1 | 1/2006 | Kyrola | |
| 2006/0075250 A1 | 4/2006 | Liao | |
| 2006/0123347 A1 | 6/2006 | Hewitt et al. | |
| 2006/0176661 A1 | 8/2006 | Allen | |
| 2006/0184351 A1 | 8/2006 | Corston-Oliver et al. | |
| 2006/0195474 A1 | 8/2006 | Cadiz et al. | |
| 2006/0253371 A1 | 11/2006 | Rutt et al. | |
| 2006/0255907 A1 | 11/2006 | Min | |
| 2006/0271526 A1 | 11/2006 | Charnock et al. | |
| 2006/0282772 A1 | 12/2006 | Chamberlin et al. | |
| 2006/0291157 A1 | 12/2006 | Allen | |
| 2006/0291158 A1 | 12/2006 | Allen | |
| 2007/0022163 A1 | 1/2007 | Wormald et al. | |
| 2007/0085839 A1 | 4/2007 | Yang et al. | |
| 2007/0088687 A1 | 4/2007 | Bromm et al. | |
| 2007/0119952 A1 | 5/2007 | Morimoto et al. | |
| 2007/0133771 A1 | 6/2007 | Stifelman et al. | |
| 2007/0133802 A1 | 6/2007 | Yuan | |
| 2007/0135091 A1 | 6/2007 | Wassingbo | |
| 2007/0144225 A1 | 6/2007 | Tamura | |
| 2007/0150842 A1 | 6/2007 | Chaudhri et al. | |
| 2007/0161410 A1 | 7/2007 | Huang et al. | |
| 2007/0203982 A1 | 8/2007 | Jagoe et al. | |
| 2007/0204064 A1 | 8/2007 | Mail et al. | |
| 2007/0220542 A1 | 9/2007 | Kim | |
| 2007/0247276 A1 | 10/2007 | Murchison et al. | |
| 2007/0274300 A1 | 11/2007 | Chu et al. | |
| 2007/0282839 A1 | 12/2007 | Walker | |
| 2008/0036743 A1 | 2/2008 | Westerman et al. | |
| 2008/0036747 A1 | 2/2008 | Hope | |
| 2008/0049135 A1 | 2/2008 | Okudaira | |
| 2008/0055269 A1 | 3/2008 | Lemay et al. | |
| 2008/0055276 A1 | 3/2008 | Chang | |
| 2008/0059880 A1 | 3/2008 | Cato et al. | |
| 2008/0064370 A1 | 3/2008 | Fukaya et al. | |
| 2008/0089587 A1 | 4/2008 | Kim et al. | |
| 2008/0122796 A1* | 5/2008 | Jobs et al. | 345/173 |
| 2008/0153459 A1 | 6/2008 | Kansal et al. | |
| 2008/0182563 A1 | 7/2008 | Wugofski et al. | |
| 2008/0189122 A1 | 8/2008 | Coletrane et al. | |
| 2008/0189623 A1 | 8/2008 | Patil et al. | |
| 2008/0207166 A1 | 8/2008 | Aerrabotu et al. | |
| 2008/0222636 A1 | 9/2008 | Wang et al. | |
| 2008/0229397 A1 | 9/2008 | Basner et al. | |
| 2008/0256170 A1 | 10/2008 | Hayashi et al. | |
| 2008/0281610 A1 | 11/2008 | Yoshida et al. | |
| 2009/0006991 A1 | 1/2009 | Lindberg et al. | |
| 2009/0029674 A1 | 1/2009 | Brezina et al. | |
| 2009/0034804 A1 | 2/2009 | Cho et al. | |
| 2009/0040018 A1 | 2/2009 | Lee et al. | |
| 2009/0044578 A1 | 2/2009 | Boss et al. | |
| 2009/0061823 A1 | 3/2009 | Chu | |
| 2009/0066489 A1 | 3/2009 | Golden | |
| 2009/0102803 A1 | 4/2009 | Newman et al. | |
| 2009/0104925 A1 | 4/2009 | Aula | |
| 2009/0106415 A1 | 4/2009 | Brezina et al. | |
| 2009/0119678 A1 | 5/2009 | Shih et al. | |
| 2009/0128335 A1 | 5/2009 | Leung | |
| 2009/0157732 A1 | 6/2009 | Hao et al. | |
| 2009/0167717 A1 | 7/2009 | Wang et al. | |
| 2009/0170553 A1 | 7/2009 | Wang et al. | |
| 2009/0177981 A1 | 7/2009 | Christie et al. | |
| 2009/0187676 A1 | 7/2009 | Griffin et al. | |
| 2009/0209235 A1 | 8/2009 | Lawler et al. | |
| 2009/0215479 A1 | 8/2009 | Karmarkar et al. | |
| 2009/0217211 A1 | 8/2009 | Hildreth et al. | |
| 2009/0234935 A1 | 9/2009 | Watson et al. | |
| 2009/0245484 A1 | 10/2009 | Bates | |
| 2009/0248844 A1 | 10/2009 | Sommer et al. | |
| 2009/0259968 A1 | 10/2009 | Hsieh et al. | |
| 2009/0264117 A1 | 10/2009 | Hsieh et al. | |
| 2009/0264157 A1 | 10/2009 | Hsieh et al. | |
| 2009/0265666 A1 | 10/2009 | Hsieh et al. | |
| 2009/0288032 A1 | 11/2009 | Chang et al. | |
| 2009/0296913 A1 | 12/2009 | Thomas et al. | |
| 2009/0327263 A1 | 12/2009 | Maghoul et al. | |
| 2010/0009727 A1* | 1/2010 | Presutti | 455/575.1 |
| 2010/0071423 A1 | 3/2010 | Dehaan et al. | |
| 2010/0079380 A1 | 4/2010 | Nurmi | |
| 2010/0082684 A1 | 4/2010 | Churchill et al. | |
| 2010/0094939 A1 | 4/2010 | Cheng et al. | |
| 2010/0105440 A1 | 4/2010 | Kruzeniski et al. | |
| 2010/0127998 A1 | 5/2010 | Hyun | |
| 2010/0145951 A1 | 6/2010 | Van Coeverden De Groot et al. | |
| 2010/0156594 A1 | 6/2010 | Chaikin et al. | |

(56) References Cited

U.S. PATENT DOCUMENTS

| | | | |
|---|---|---|---|
| 2010/0159944 | A1 | 6/2010 | Pascal et al. |
| 2010/0159995 | A1* | 6/2010 | Stallings et al. .............. 455/566 |
| 2010/0162133 | A1 | 6/2010 | Pascal et al. |
| 2010/0164740 | A1 | 7/2010 | Lo et al. |
| 2010/0199359 | A1 | 8/2010 | Cao et al. |
| 2010/0207723 | A1 | 8/2010 | Cao et al. |
| 2010/0214237 | A1 | 8/2010 | Echeverri et al. |
| 2010/0223097 | A1 | 9/2010 | Kramer et al. |
| 2010/0241971 | A1 | 9/2010 | Zuber |
| 2010/0251116 | A1 | 9/2010 | Rimas-Ribikauskas et al. |
| 2010/0257490 | A1 | 10/2010 | Lyon et al. |
| 2010/0309149 | A1 | 12/2010 | Blumenberg et al. |
| 2010/0317335 | A1 | 12/2010 | Borovsky et al. |
| 2010/0325155 | A1 | 12/2010 | Skinner et al. |
| 2011/0035673 | A1 | 2/2011 | Chou et al. |
| 2011/0035708 | A1 | 2/2011 | Damale |
| 2011/0062143 | A1 | 3/2011 | Satanek et al. |
| 2011/0081922 | A1 | 4/2011 | Chandra et al. |
| 2011/0169909 | A1 | 7/2011 | Gu |
| 2012/0030287 | A1 | 2/2012 | Leonard |
| 2012/0303712 | A1 | 11/2012 | Polis et al. |
| 2012/0319985 | A1 | 12/2012 | Moore et al. |

OTHER PUBLICATIONS

"Global Framework—VD Specification". AT&T Armstrong project. Version 1.11. Last accessed Jun. 16, 2010, 117 pages.
"Phone Top—UE Flows and Screen Details". AT&T Armstrong Project. Version 1.18. Last accessed Jun. 16, 2010, 104 pages.
"Phone Top—VD Specification". AT&T Armstrong Project. Version 1.12. Last accessed Jun. 16, 2010, 52 pages.
"Phone / Dailer—UE Flows and Screen Details". AT&T Armstrong Project. Version 1.8. Last accessed Jun. 16, 2010, 57 pages.
"Dialer—VD Specification". AT&T Armstrong Project. Version 1.7. Last accessed Jun. 16, 2010, 19 pages.
"Contacts—UE Flows and Screen Details". AT&T Armstrong Project. Version 2.6. Last accessed Jun. 16, 2010, 142 pages.
"Contact—VD Specification". AT&T Armstrong Project. Version 2.2. Last accessed Jun. 16, 2010. 48 pages.
"Third-Party Pickers—UE Flows and Screen Details". AT&T Armstrong Project. Version 1.1. Last accessed Jun. 16, 2010, 23 pages.
"3rd Party Pickers". AT&T C@lumbus Project. Version 1.1. Last accessed Jun. 16, 2010, 7 pages.
"Social—UE Flows and Screen Details". AT&T C@lumbus Project. Version 1.5. Last accessed Jun. 16, 2010, 107 pages.
"Social—VD Specification". AT&T C@lumbus Project. Version 1.5. Last accessed Jun. 16, 2010, 39 pages.
"Media App—UE Flows and Screen Details". AT&T Armstrong Project. Version 1.6. Last accessed Jun. 16, 2010, 118 pages.
"Media—VD Specification". AT&T Armstrong Project. Version 1.3. Last accessed Jun. 16, 2010, 29 pages.
"Mobile Share—Reduced Scope; UE Flows and Screen Details". AT&T Armstrong Project. Version 1.2 RS. Last accessed Jun. 16, 2010, 59 pages.
"Mobile Share (Reduced Scope)". AT&T Armstrong Project. Version 1.2RS. Last accessed Jun. 16, 2010, 15 pages.
"Camera App—UE Flows and Screen Details". AT&T Armstrong Project. Version 1.8. Last accessed Jun. 16, 2010, 77 pages.
"Camera—VD Specification". AT&T Project. Version 1.8. Last accessed Jun. 16, 2010, 22 pages.
"Alarm Clock—UE Flows and Screen Details". AT&T Armstrong Project. Version 1.4. Last accessed Jun. 16, 2010, 35 pages.
"Alarm Clock—VD Specification". AT&T Armstrong Project. Version 1.4. Last accessed Jun. 16, 2010, 18 pages.
"Settings—UE Flows and Screen Details". AT&T Armstrong Project. Version 1.18. Last accessed Jun. 16, 2010, 180 pages.
"Settings—VD Specification". AT&T Armstrong Project. Version 1.8. Last accessed Jun. 16, 2010, 40 pages.
"Conversations—UE Flows and Screen Details". AT&T Armstrong Project. Version 1.3. Last accessed Jun. 16, 2010, 148 pages.
"Conversations". AT&T Armstrong Project. Version 1.5. Last accessed Jun. 16, 2010, 54 pages.
"Firmware Over the Air Updates—UE Flows and Screen Details". AT&T Armstrong Project. Version 1.9. Last accessed Jun. 16, 2010, 39 pages.
Paul McDougall. Browser. AT&T Armstrong Project. Version 1.3. Last accessed Jun. 16, 2010, 6 pages.
Paul McDougall. Maps. AT&T Armstrong Project. Version 1.3. Last accessed Jun. 16, 2010, 8 pages.
"Reference Guide". AT&T Armstrong Project. Version 1.0, Last accessed Jun. 16, 2010, 4 pages.
D. Austin Henderson, Jr. Rooms: the use of multiple virtual workspaces to reduce space contention in a window-based graphical user interface. ACM Transactions on Graphics. http://portal.acm.org/citation.cfm?id=24056&coll=portal&dl=ACM& CFID=23778768& CFTOKEN=77139655.
http://www.siliconvalleywatcher.com/mt/archives/2010/04/panama_kill_voi.php.
http://www.google.com/support/forum/p/voice/thread?tid=64d1c9d5fb45cccf&hl=en.
Bob Tedeschi, Group Texting Grows Up, With Features That Appeal to Adults. http://www.nytimes.com/2010/10/21/technology/personaltech/21smart.html. Last accessed Nov. 1, 2010, 3 pages.
A Teenager's Dream: An iPhone App for Free Texting—Bits Blog—NYTimes.com. http://bits.blogs.nytimes.com/2009/08/25/a-teens-dream-an-iphone-app-for-tree-texting. Last accessed Oct. 13, 2009, 19 pages.
Build and grow with Facebook Connect. http://developers.facebook.com/connect.php? tab=website. Last accessed Nov. 2, 2009, 2 pages.
Build and grow with Facebook Connect. http://developers.facebook.com/connect.php?tab=iphone. Last acceseed Nov. 2, 2009, 1 pages.
http://www.sprint.com/cdma/assets/pdfs/phone_guides/palm/palm_pre_p100_ug.pdf at pp. 44, 57-58. Last accessed Nov. 6, 2009, 3 pages.
MTN—Meeting the needs of the South African market for a new mobile messaging solution—Mobile IM. http://www.moviuscorp.com/files/case_study_mtn.pdf. Last accessed Nov. 2, 2009, 5 pages.
http://www.bizzia.com/buzznetworker/social-web-aggregation. Last accessed Nov. 6, 2009, 4 pages.
Alexander The Late. http://alexanderthelate.wordpress.com/2008/02/11/social-media-aggregation-lifestreaming-all-of-your-web-activity-in-one-simple-and-potentially-inconvenient-place/. Last accessed Nov. 3, 2009, 3 pages.
Schroeder, 20 Ways to Aggregate Your Social Networking Profiles, http://mashable.com/2007/07/17/social-network-aggregators/, Jul. 17, 2007, 20 pages.
Hirsch, iPhone 2.0 Apps: The Social Networking App Comparison, http://mashable.com/2008/07/17/iphone-social-networking-app-comparison/, Jul. 17, 2008, 9 pages.
Lifestream: Bebo's new social media aggregation tool | Media | guardian.co.uk, http://www.guardian.co.uk/media/pda/2009/feb/23/socialnetworking-bebo, Last Accessed Nov. 6, 2009, 3 pages.
Wikipedia, Social network aggregation—Widipedia, the free encyclopedia, http://en.wikipedia.org/wiki/Social_Network_Aggregation, Last Accessed Nov. 6, 2009, 3 pages.
Jaiku | Your Conversation, www.jaiku.com, Last accessed Nov. 6, 2009, 3 pages.
StumbleUpon.com: Personalized Recommendations to Help You Discover the Best of the . . . , www.stumbleupon.com, Last accessed Nov. 6, 2009, 2 pages.
The Walt Disney Internet Group, www.dig.com, Last accessed Nov. 6, 2009, 1 page.
Delicioussocial bookmarking, www.del.icio.us, Last accessed Nov. 6, 2009, 6 pages.
Google Wave—Wikipedia, the free encyclopedia, http://en.wikipedia.org/wiki/Google_wave, Last accessed Dec. 18, 2009, 5 pages.
Motorola Backflip (TM )—Wireless from AT&T, http://www.wireless.att.com/cell-phone-service/cell-phone-sales/promotion/motobackflip.jsp, Last Accessed Mar. 29, 2010, 2 pages.
Motoblur—Motorola USA, http://www.motorola.com/Consumers/US-EN/Consumer-Product-and-Services/MOTOBL . . . , Last accessed Mar. 29, 2010, 3 pages.

(56) References Cited

OTHER PUBLICATIONS

OA dated Feb. 11, 2013 for U.S. Appl. No. 12/902,979, 53 pages.
OA dated Jan. 30, 2013 for U.S. Appl. No. 12/903,632, 28 pages.
OA dated Dec. 20, 2012 for U.S. Appl. No. 12/903,679, 40 pages.
OA dated Mar. 13, 2013 for U.S. Appl. No. 12/643,726, 55 pages.
OA dated Apr. 6, 2012 for U.S. Appl. No. 12/643,726, 43 pages.
OA dated Jun. 12, 2012 for U.S. Appl. No. 12/903,618, 41 pages.
"Brads Live: AddressBooker & exporting my Facebook Phonebook" http://brad.livejournalcom/2398409.html as archived on archive.org on Dec. 5, 2008.
OA dated Aug. 1, 2012 for U.S. Appl. No. 12/903,632, 47 pages.
OA dated Sep. 7, 2012 for U.S. Appl. No. 12/902,979, 63 pages.
OA dated Nov. 14, 2011 for U.S. Appl. No. 12/643,726, 59 pages.
Spagnuolo-Tweetdeck, http://edgehopper.com/how-to-use-tweetdeck-the-ultimate-twitter-client/,Feb. 12, 2009, 11 pages.
OA dated May 14, 2013 for U.S. Appl. No. 12/903,414, 62 pages.
Office Action dated Jan. 31, 2014 for U.S. Appl. No. 12/903,679, 17 Pages.
Notice of Allowance dated Jun. 27, 2014 for U.S. Appl. No. 12/903,679, 29 Pages.
Non-Final OA dated Jun. 18, 2014 for U.S. Appl. No. 12/643,726.
Office Action dated Aug. 23, 2013 for U.S. Appl. No. 12/643,726, 61 pages.
Office Action dated Oct. 11, 2013 for U.S. Appl. No. 12/903,679, 22 pages.
Office Action dated Sep. 26, 2013 for U.S. Appl. No. 12/903,618, 36 pages.
Office Action dated Aug. 26, 2014 for U.S. Appl. No. 12/903,618, 25 pages.
Office Action dated Sep. 30, 2014 for U.S. Appl. No. 12/643,726, 63 pages.
Sprint, "Palm Pre Phone User Guide," 2009, 388 Pages, Palm, Inc., United States.
Office Action dated Mar. 10, 2015 for U.S. Appl. No. 12/903,618, 24 Pages.

\* cited by examiner

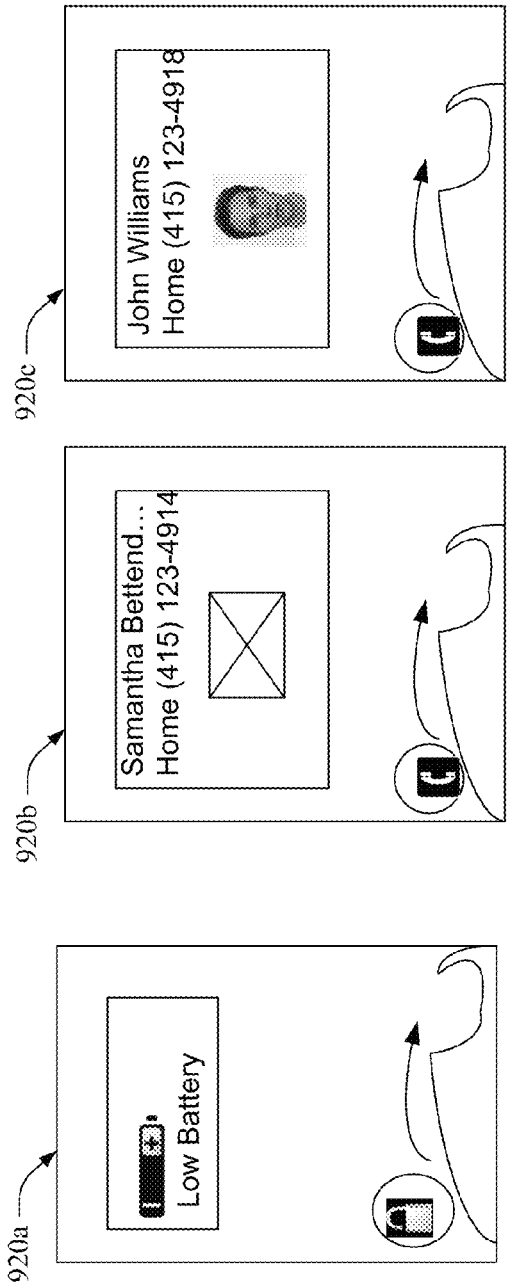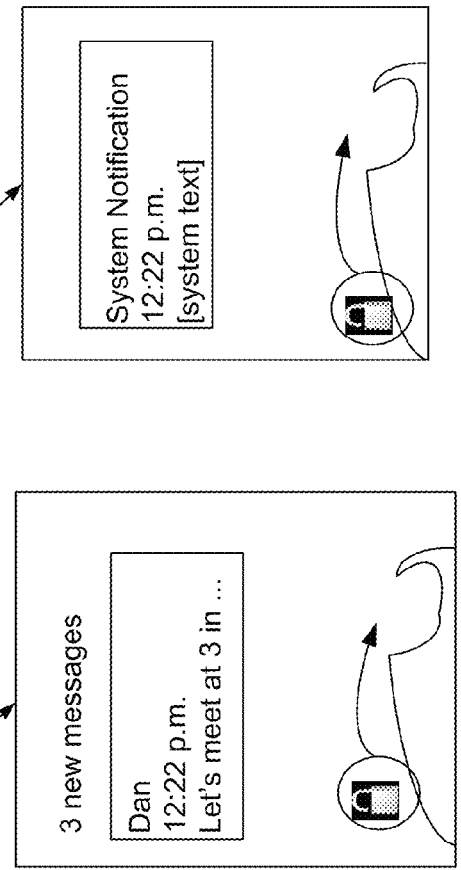

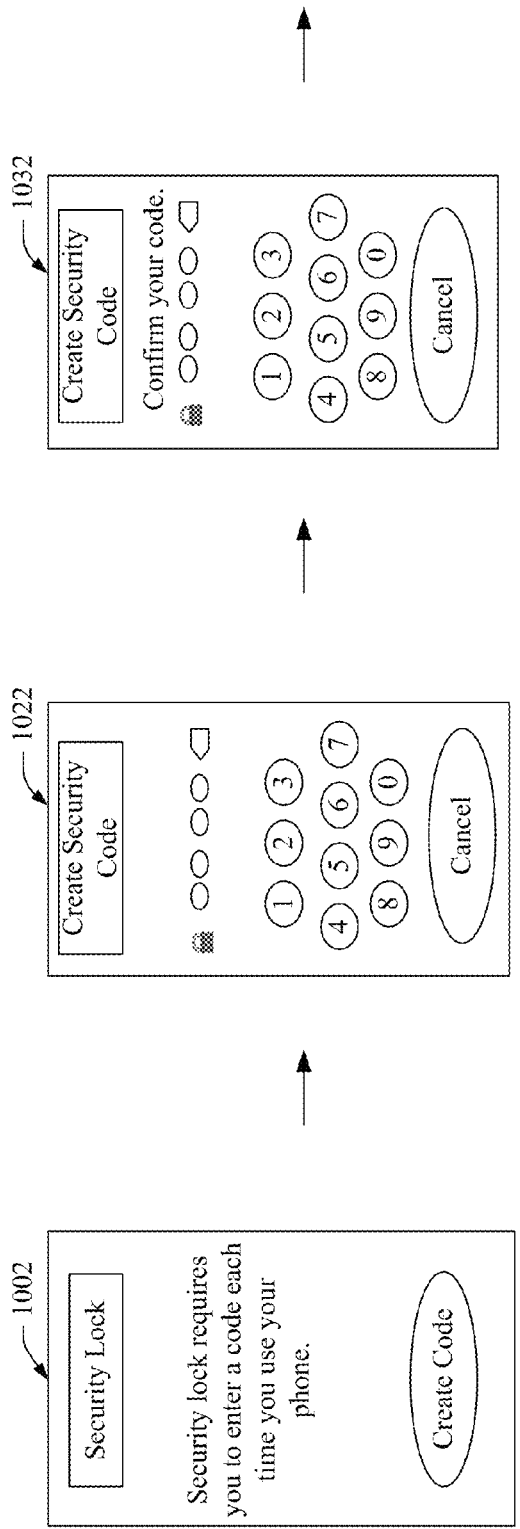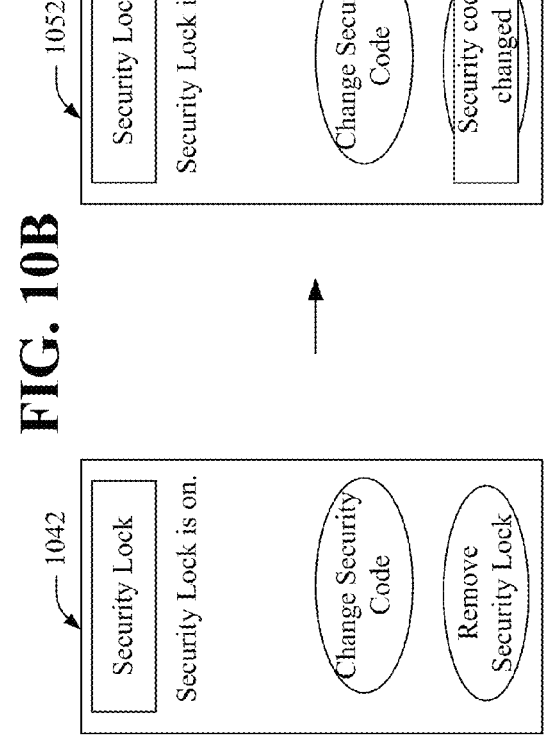

APPARATUS, METHODS AND COMPUTER-READABLE STORAGE MEDIA FOR SECURITY PROVISIONING AT A COMMUNICATION DEVICE

CROSS-REFERENCES TO RELATED APPLICATIONS

This application claims priority to and the benefit of U.S. Provisional Application No. 61/251,717, filed Oct. 14, 2009, and titled "SYSTEMS, METHODS AND APPARATUS FOR NEXT-GENERATION MOBILE MESSAGING," the entire contents of which is incorporated herein by reference.

BACKGROUND

With advancements in technology, communication devices are becoming ubiquitous throughout society due to the convenience of use resultant from their lightweight nature and extensive information processing capabilities. Communication devices often include user interfaces (UIs) configured to receive inputs for access and control to the communication devices. Inputs to the UI can be inadvertently provided by an authorized user of the communication device due to unintended pressure on a touch screen of the UI from objects in close proximity to the touch screen. The common problems of unintended manipulation of data and unintended initiation of calls are ever-present due to such inadvertent inputs to the touch screen.

Further, because of extensive information processing capabilities, communication devices often store and/or provide access to sensitive data that must be protected from viewing or manipulation by unauthorized third-parties that can gain possession of the communication devices. Additionally, users of communication devices desire to be protected from unauthorized third-parties placing unauthorized non-emergency calls with the communication devices at the expense of the rightful users of the communication devices.

Based on the above, security of communication devices is of utmost importance, and systems, apparatus, methods and computer-readable storage media for security provisioning at communication devices are desirable.

SUMMARY

The following presents a simplified summary in order to provide a basic understanding of various aspects described herein. The summary is not an extensive overview, and is not intended to identify key or critical elements or to delineate the scopes thereof. The sole purpose of the summary is to present selected concepts in a simplified form as a prelude to the more detailed description that is presented below.

The aspects described herein include systems, apparatus, methods and computer-readable storage media for security provisioning at communication devices.

In one aspect, a computer-implemented method is provided. The computer-implemented method can include executing a high security application on a communication device based, at least, on detecting that high security is enabled for the communication device and detecting execution of a low security application; outputting, via a user interface (UI), information configured to detect an entry to the communication device; detecting an entry at the UI of the communication device; determining whether the entry corresponds to security access information stored in the communication device; and providing access to the communication device based, at least, on determining that the entry corresponds to the security access information.

In another aspect, an apparatus is provided. The apparatus can include: a processor; and a security component. The security component can be configured to: detect whether high security is enabled for the apparatus; execute a high security application on the apparatus based, at least, on detection that high security is enabled for the apparatus and execution of a low security application at the apparatus; receive a signal indicative of an entry at the apparatus; determine whether the entry corresponds to security access information accessible by the communication device; unlock the apparatus based, at least, on determining that the entry corresponds to the security access information; and display information associated with the high security application and configured to receive the entry. The apparatus can also include a computer-readable storage medium storing computer-executable instructions that, if executed, cause the processor to perform one or more functions of the security component.

In another aspect, a computer-readable storage medium is provided. The computer-readable storage medium stores computer-executable instructions that, if executed by a processor of a communication device, cause the processor to: detect whether high security is enabled for the communication device; display, via a user interface (UI), information associated with the high security application; and execute a high security application on the communication device based, at least, on detection that high security is enabled for the communication device and execution of a low security application at the communication device.

BRIEF DESCRIPTION OF THE DRAWINGS

Non-limiting and non-exhaustive embodiments of various aspects detailed herein are described with reference to the following figures, wherein like reference numerals refer to like parts.

FIGS. 9A, 9B, 9C, 9D, 9E, 9F, 9G, 9H and 9I are exemplary display regions of a user interface facilitating notifications and security for a communication device in accordance with various aspects and embodiments described herein.

FIGS. 10A, 10B, 10C, 10D and 10E are display regions illustrating an exemplary flow diagram for initializing or re-setting security access information facilitating high security protocols for a communication device in accordance with various aspects and embodiments described herein.

DETAILED DESCRIPTION

Figure 1:
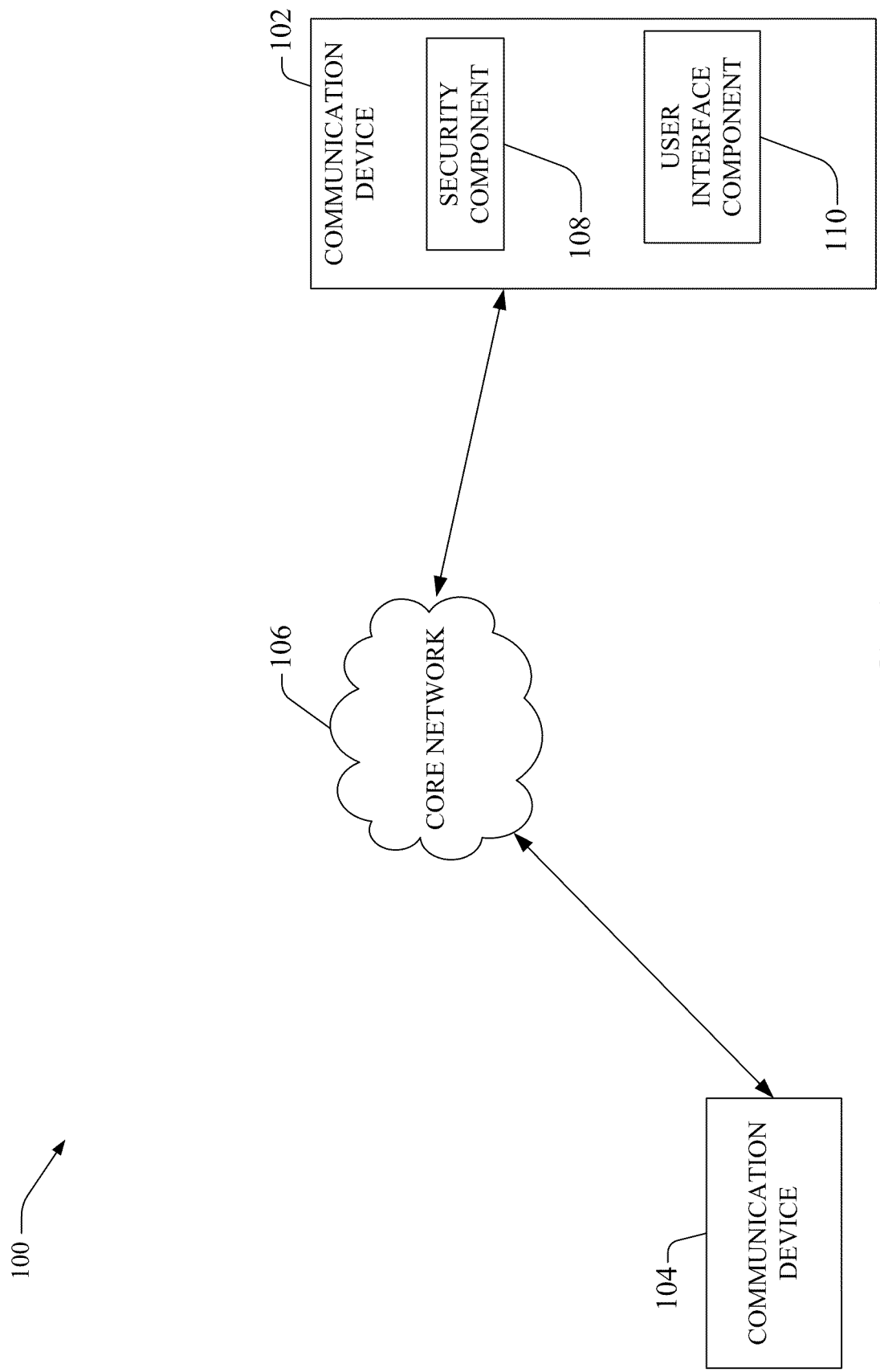
FIG. 1 illustrates a block diagram of an exemplary system for security provisioning at a communication device in accordance with various aspects and embodiments described herein.

Certain illustrative embodiments are described herein in the following description and the annexed drawings. These embodiments are merely exemplary, non-limiting and non-exhaustive. As such, all modifications, alterations, and variations within the spirit of the embodiments is envisaged and intended to be covered herein.

Further, in the following description, for purposes of mere explanation, numerous, specific details are set forth in order to facilitate a more thorough understanding of the embodiments described herein, including the claimed subject matter. However, as is known to those of ordinary skill in the art, the embodiments can be practiced, in many instances, without inclusion of the specific details.

As used in this application, the terms "component," "module," "system," "interface," and the like, are generally intended to refer to hardware and/or software or software in execution. For example, a component can be, but is not limited to being, a process running on a processor, a processor, an object, an executable, a thread of execution, a program and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application and/or application programming interface (API) components, and can be as simple as a command line or as complex as an Integrated Development Environment (IDE).

Furthermore, the embodiments can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), digital versatile disk (DVD)), smart cards, and/or flash memory devices (e.g., card, stick, key drive). Additionally it should be appreciated that a carrier wave can carry computer-readable electronic data (e.g., the data transmitted and received via email and/or to access the Internet or a network such as a local area network (LAN)). As known to those of ordinary skill in the art, modifications can be made to the above embodiments without departing from the spirit of the disclosure.

It will be appreciated by one of skill in the art that a communication network for systems described herein can include any suitable mobile- and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further examples of a communication network can include any suitable data packet-switched or combination data packet/circuit-switched communication network, wired or wireless internet protocol (IP) network such as a voice over internet protocol (VoIP) network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device for systems disclosed herein can include a mobile device, mobile phone, a PSTN phone, a cellular communication device, a cellular phone, a satellite communication device, a satellite phone, a VoIP phone, a wireless fidelity (WiFi) phone, a dual-mode cellular/WiFi phone, a combination cellular/VoIP/WiFi/Worldwide Interoperability for Microwave Access (WiMAX) phone or any suitable combination thereof. Specific examples of a mobile device can include, but is not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones UMTS VoIP phones, or like devices or combinations thereof. To provide support for a mobile device, a gateway routing component can include any suitable component that can perform centralized routing within a mobile, satellite, or similar network (but optionally need not include components that route strictly within a PSTN network), routing between communication networks, between networks of varying architecture (e.g., between PSTN, GSM, Universal Mobile Telecommunications System (UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such a system can include any suitable device, process and/or combination device and process that can store digital and/or switched information (e.g., server, database, data store, or the like).

FIG. 1 illustrates a block diagram of an exemplary system that facilitates security of a communication device in accordance with various aspects and embodiments described herein. In an aspect, the system 100 can include communication devices 102, 104 and a core network 106. The communication devices 102, 104 can be communicatively coupled to the core network 106. In various embodiments, one or more of communication devices 102, 104 can include the software, hardware and/or have the functionality and/or structure (or portions thereof) of communication device 200 described below (and vice versa).

In various embodiments, the core network 106 can include one or more of software, hardware and/or combination software and hardware configured to provide connectivity to and between the communication devices 102, 104. The system 100 can include one or more macro, Femto and/or pico access points (APs) (not shown), base stations (BS) (not shown) or landline networks (e.g., optical landline networks, electrical landline networks) (not shown) communicatively coupled between one or more of the communication devices 102, 104 and the core network 106 to provide connectivity between the communication devices 102, 104 and the core network 106. In various embodiments, the communication devices 102, 104 can communicate via any number of various types of wireless technologies including, but not limited to, cellular, WiFi, WiMax, wireless local area networks (WLAN), etc. In corresponding embodiments, the core network 106 can provide cellular, WiFi, WiMAX, WLAN and other technologies for facilitating such communication. The core network 106 can also include the Internet (or another communication network (e.g., IP-based network), a digital subscriber line (DSL)-type or broadband network facilitated by Ethernet or other technology. The core network 106 can also include, in various embodiments, servers including, email, multimedia, audio, video, news, financial or stock information servers.

The core network 106 can also include short message service (SMS) networks and multimedia message service (MMS) networks. The core network 106 can also include but is not limited to, routers, nodes, switches, interfaces, and/or controllers that can facilitate communication of data to or from the communication devices 102, 104. The core network 106 can transmit and receive voice, text, pictorial, video, audio and/or data traffic to and from the communication devices 102, 104. While only communication devices 102 and 104 are shown, in various embodiments, the core network 106 can include or can be communicatively coupled to other communication devices inside or outside of the network. In various embodiments, the network can also include hardware, software and/or a combination of hardware and software for allocating resources to the communication devices 102, 104, converting or enforcing protocols, establishing and/or providing levels of Quality of Service (QoS), applications or services in the network, translating signals, and/or performing other desired functions to facilitate system interoperability and communication to or from the communication devices 102, 104.

In various embodiments, the core network 106 can include or can be communicatively coupled to one or more of multimedia servers (not shown), email servers (not shown), databases (not shown), Internet (not shown) for communicating one or more of text or email messages, data, pictures, multimedia, voice or video.

The core network 106 can also include databases and/or memory storing information and/or computer-readable storage media storing computer-executable instructions enabling various operations by the communication devices 102, 104. In some embodiments, the core network 106 can include databases and/or memory storing computer-executable instructions and/or settings for providing one or more levels of security to, from or within the communication devices 102, 104. In some embodiments, a database can store settings, and/or memory can store computer-executable instructions, enabling the communication device 104 to operate according to a high security protocol as described in greater detail herein.

In various embodiments, the communication devices 102, 104 can be mobile, wireless, wireline and/or optical devices. The communication devices 102, 104 can include, but are not limited to, a mobile or cellular telephone including, but not limited to, a smartphone, BLUETOOTH® device, a 3GPP UMTS phone, a personal digital assistant (PDA), computer, IP television (IPTV), wireline phone with mobile messaging functionality, gaming console, a set top box (STB), a multi-media recorder, a multi-media player, a video recorder, a video player, an audio recorder, an audio player, laptop, a printer, a copier and/or a scanner.

In various embodiments, the communication devices 102, 104 can include hardware, software or a combination of hardware and software facilitating operation according to one or more communication protocols described above with reference to the core network 106, or the functionality facilitated by the hardware, software or combination hardware and software described above with reference to the core network 106. The communication protocols and/or functionality can include, but is not limited to, MMS, SMS, WLAN, WiFi, WiMAX, BLUETOOTH® protocol, text messaging, electronic mail messaging, facsimile, multimedia and/or any number of other protocols or functionalities as described above with reference to the communications protocols or functionalities facilitated by core network 106. In various embodiments, the communication devices 102, 104 can transmit and/or receive voice, text, pictorial, video, audio and/or data traffic to and from the communication devices 102, 104.

In some embodiments, the communication devices 102, 104 can include hardware, software and/or a combination of hardware and software to facilitate providing one or more levels of security to, from or within the communication devices 102, 104 as described herein. For example, in various embodiments, as shown at communication device 102, the communication devices 102, 104 can include a security component 108 and a UI component 110 for security provisioning at the communication device 102. In various embodiments, the UI component 110 can facilitate receiving or outputting information for providing or enabling the one or more security functions or protocols, providing or enabling communication to or from the communication device 102, accessing information stored within, or storing information within, the communication device 102, or any controlling the communication device 102, or receiving information output from the communication device 102, via the UI component 110.

In various embodiments, the communication device 102 can provide one or more levels of security for the communication device 102. The one or more levels of security and/or locking and unlocking for the communication device 102 can include those disclosed and claimed in U.S. Non-Provisional patent application Ser. No. 12/902,979, filed Oct. 12, 2010, titled "LOCKING AND UNLOCKING OF AN ELECTRONIC DEVICE USING A SLOPED LOCK TRACK," and/or U.S. Non-Provisional patent application Ser. No. 12/643,726, filed Dec. 21, 2009, titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY," the entire contents of which are incorporated herein by reference in their entireties.

While security methods and communication devices facilitating such are described below with reference communication device 200, in various embodiments, the communication device 200 can be or include one or more of the functions or structure (or portions thereof) of communication device 102, 104 (and vice versa).

Figure 2:
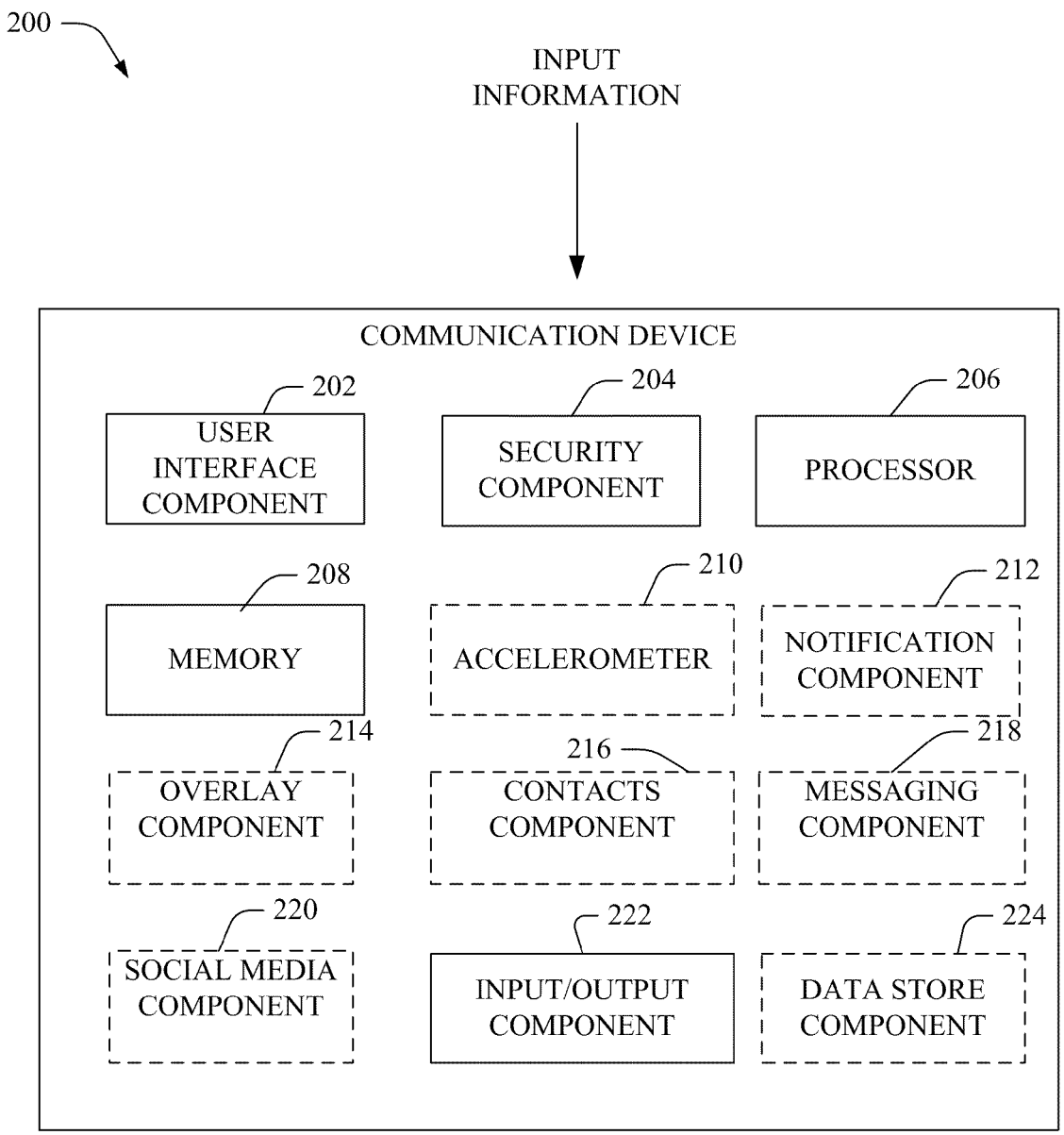
FIG. 2 illustrates a block diagram of an exemplary communication device at which security is provisioned in accordance with various aspects and embodiments described herein.

Turning now to FIG. 2, FIG. 2 illustrates a block diagram of a communication device that facilitates security in accordance with various aspects and embodiments described herein. The communication device 200 can include a UI component 202, a security component 204, a processor 206, a memory 208 and an input/output (I/O) component 222. In various embodiments, the communication device 200 can include an accelerometer 210, a notification component 212, an overlay component 214, a contacts component 216, a messaging component 218, a social media component 220 and/or a data store component 224. One or more of the components can be communicatively coupled to one another to perform the functions of the communication device 200 described herein.

Referring first to the I/O component 222, the I/O component 222 can include hardware, software and/or a combination of hardware and software facilitating receipt and output of information to and from the communication device 200 and/or detection of communication device events affecting or occurring at the communication device 200. The receipt and output of such information and the detection of communication device events can be utilized to provision security at the communication device 200. In some embodiments, the I/O component 222 can work in conjunction with the accelerometer 210, which can detect movement of the communication device 200 as described in more detail below.

As described above, the I/O component 222 can detect communication device events to provision security at the communication device 200. Detection of the communication device events can be the impetus to initiate either a high security protocol and/or a low security protocol. In some embodiments, detection of a communication device event can be the impetus to stop a security protocol in process.

In various embodiments, communication device events can be any event acted upon the communication device that can be detected by an I/O component 222. By way of example, but not limitation, communication device events can include, but are not limited to, activation (e.g., depression, tap or other stimulus) of a hard key (e.g., a power or volume button) of the communication device 200, initiation of a boot sequence for the communication device 200, illumination of a backlight of the communication device 200, trigger of a timer for the communication device, and/or movement of a physical keypad with which the communication device 200 can be designed in some embodiments.

With regard to movement of a physical keypad with which the communication device can be designed, in various embodiments, when the communication device 200 is designed with a physical keypad, the physical keypad can be designed to slide, flip or otherwise move relative to the remaining body portion of the communication device 200. For example, the communication device 200 could be designed such that a physical keypad slides away from the remaining portion of the body of the communication device 200. When the above-referenced motion (e.g., sliding, flipping, opening, closing or otherwise moving relative to the remaining portion of the body of the communication device 200) occurs, such motion can be considered a communication device event. Typically, such movement indicates initiation of use of the communication device 200 and such movement can therefore be an important communication device event for initiating security protocols of the communication device to protect from unauthorized use. Further, movement such as closing the physical keypad can be an indicator that the user has ceased interest in operating the communication device and can therefore be an impetus for stopping a security protocol that is in progress.

Turning now to the UI component 202, the UI component 202 can include hardware, software and/or a combination of hardware and software facilitating display of information from the communication device. Because information and UI displays for security provisioning can be provided via the UI component 202, the UI component 202 can work in conjunction with the I/O component 222 and the security component 204 (which is described in greater detail below).

The UI component 202 can control the UI for the communication device 200. The UI can be any number of different types of UIs including, but not limited to, a graphical user interface (GUI), a touch-sensitive interface (e.g., a touch screen), an interface having capability for receiving audio or video input (and outputting audio or video information) and the like. In some embodiments described herein, the UI can include a touch screen configured to receive inputs at the touch screen and graphically output information for security provisioning from the touch screen.

The UI can be enabled to display alpha and/or numeric characters, slopes, icons and lock tracks for security provisioning via selection from the touch screen, entry of text, swiping, dragging or flicking icons, activating buttons and/or performing any number of other actions for controlling whether the UI of the communication device 200 or the communication device 200 itself is unlocked or locked. For example, the UI can display the display regions described in more detail below, and shown at FIGS. 6A, 6B, 7, 8A and/or 8B.

Upon receipt of an entry at the UI, and/or upon detection of a communication device event, the I/O component 222 can send a signal informing the security component 204.

Turning now to the security component 204, the security component 204 can include software, hardware and/or a combination of hardware and software one or more levels of security to, from or within the communication device 200. In some embodiments, the security can be initiated upon receiving the signal at the security component 204. In other embodiments, security can be initiated upon determination of pre-existing events by the security component 204. For example, in some embodiments, the security component 204 can implement a high security protocol upon determining that a low security protocol has been successfully completed on the communication device 200.

The security protocol implemented by the security component can depend on the level of security enabled for the communication device 200. For example, high security can be enabled in some embodiments. Accordingly, the security component 204 can be configured to detect whether high security is enabled for the communication device 200. If high security is enabled, the security component can implement a high security protocol. The high security protocol can be implemented in conjunction with execution of a high security application in some embodiments. The high security application can be stored on or accessible to the communication device 200 in various embodiments.

FIGS. 6A, 6B, 6C and 6D illustrate block diagrams of display regions of UIs facilitating high security of a communication device in accordance with various aspects and embodiments described herein. If high security is enabled, the security component 204 can transmit a signal to the UI component 202 indicating that high security is enabled. The UI component 202 can control the UI to display information associated with the high security protocol and shown at FIGS. 6A, 6B, 6C, 6D for example.

The communication device 200 can include a memory 208 and/or data store component 224. The memory 208 and/or data store component 224 can store information and/or settings and/or computer-executable instructions for performing one or more functions described herein for the communication device 200. In various embodiments, the data store component 224 that can store data structures (e.g., user data, application data, metadata); code structure(s) (e.g., modules, objects, classes, procedures) or instructions; message hashes; neighbor cell list; information relating to securing the communication device 200 and information associated therewith, displaying information in the UI display screen, generating or displaying an overlay display region, generating or processing notifications and associated notification-related information; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor 206 can be functionally coupled (e.g., through a memory bus) to the data store component 224 in order to store and retrieve information (e.g., neighbor cell list; information relating to securing the communication device 200 and information associated therewith, displaying information in the UI display screen, generating or displaying an overlay display region, generating or processing notifications and associated notification-related information; frequency offsets; desired algorithms; etc.) desired to operate and/or confer functionality, at least in part, to, security component 204, UI component 202, overlay component 214, notification component 212, and/or substantially any other operational aspects or components of the communication device 200.

Referring back to FIG. 2, in some embodiments, the memory 208 and/or data store component 224 can store a setting for enabling a high security protocol to be initiated. The setting can be any alpha, numeric or other information type that can be stored in the memory 208 and/or data store component 224 and can indicate that high security is enabled. In some embodiments, if a null value is stored in memory 208 and/or the data store component 224, the high security protocol can be disabled or not enabled.

In various embodiments, the memory 208 and/or data store component 224 can also store the security access information enabling access to the communication device 200. Security access information can include, but is not limited to, a personal identification number (PIN), code (which can include alpha characters, numeric characters, symbols and/or a combination of alpha characters, numeric characters and/or symbols), and/or biometric information, including, but not limited to, fingerprint information or retinal scan information, associated with, stored in or accessible by the communication device 200.

In some embodiments, a user and/or owner of the communication device 200 can initialize security access information or re-set a previously-initialized security access information. FIGS. 10A, 10B, 10C, 10D and 10E show display regions illustrating a method of initializing or re-setting the security access code.

With reference to FIGS. 10A, 10B, 10C, 10D and 10E, in some embodiments, when the security access information is a numerical code composed of a number of numerical values, the communication device 200 can be configured to receive the code as the security access information. For example, the communication device 200 can be configured to transition to a mode in which the communication device initializes or re-sets a code by activating a button or icon for creating a code, as shown at FIG. 10A.

Figure 6A:
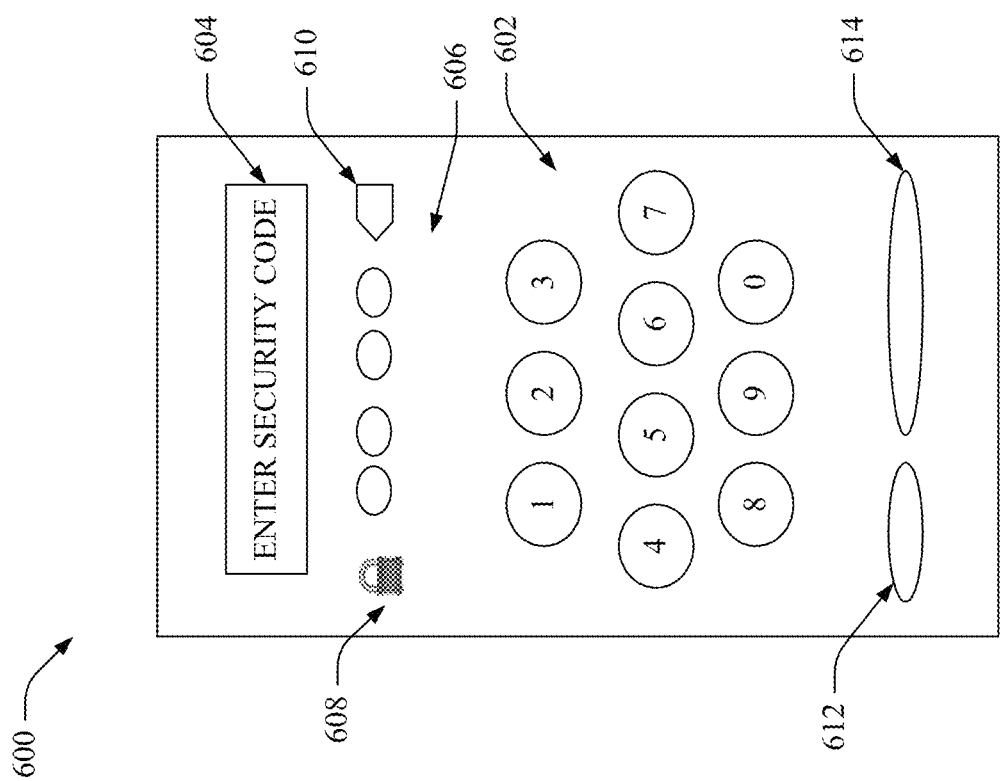
FIGS. 6A, 6B, 6C and 6D illustrate block diagrams of display regions of UIs for security provisioning at a communication device in accordance with various aspects and embodiments described herein.

The communication device 200 can prompt the user to enter numerical values indicative of the numerical code (as shown at FIG. 10B). With reference to FIG. 6A, the numerical values for the code can be entered at the keypad 602 (or at the keypad shown on FIG. 10B). The communication device 200 can receive the numerical code and, in some embodiments, prompt the user to re-enter the numerical code to confirm the accuracy of the first entered code (as shown at FIG. 10C). The communication device 200 can determine if the first entered code is the same as the second entered code. If first entered code is the same as the second entered code, the communication device 200 can store the code as the security access information for unlocking the communication device 200 during the high security protocol. If the first entered code is not the same as the second entered code, the communication device 200 can prompt the user to re-enter the code until a first entered code is the same as a second entered code. In various embodiments, display regions such as those shown at FIGS. 10B, 10C, 10D and 10E can display one or more messages instructing the user to enter the code and/or informing the user if the first entered code does or does not match the second entered code and/or if the code (i.e., security access information) has been set.

In some embodiments, as shown in FIG. 10D, high security can be turned off by removing the security lock. In some embodiments, as shown in FIGS. 10D and/or 10E, the security code (i.e., security access information) can be removed and/or re-set (e.g., changed).

The security access information can be accessed by the security component 204 to perform the security provisioning at the communication device 200.

For example, upon initiating the high security protocol, the security component 204 can send a signal to the UI component 204 causing the UI to display the display region shown at FIG. 6A. The security component 204 can determine whether an entry provided to the UI by the user of the communication device matches or otherwise corresponds to the security access information.

The security component 204 can be configured to unlock the communication device 200 if the security component 204 determines that the entry matches or corresponds to the security access information.

The security component 204 can be configured to not unlock (or deny unlocking) the communication device 200 if the security component 204 determines that the entry does not match or correspond to the security access information. In this case, the security component 204 can determine a number of times that an entry that does not match or correspond to the security access information has been entered at the UI. The security component 204 or other component of the communication device 200 can initiate a timeout state based on determining that the number of times exceeds a predetermined maximum number of times for attempted access to the communication device 200. While in the timeout state, access to the communication device 200 can be limited or prevented altogether.

Figure 6B:
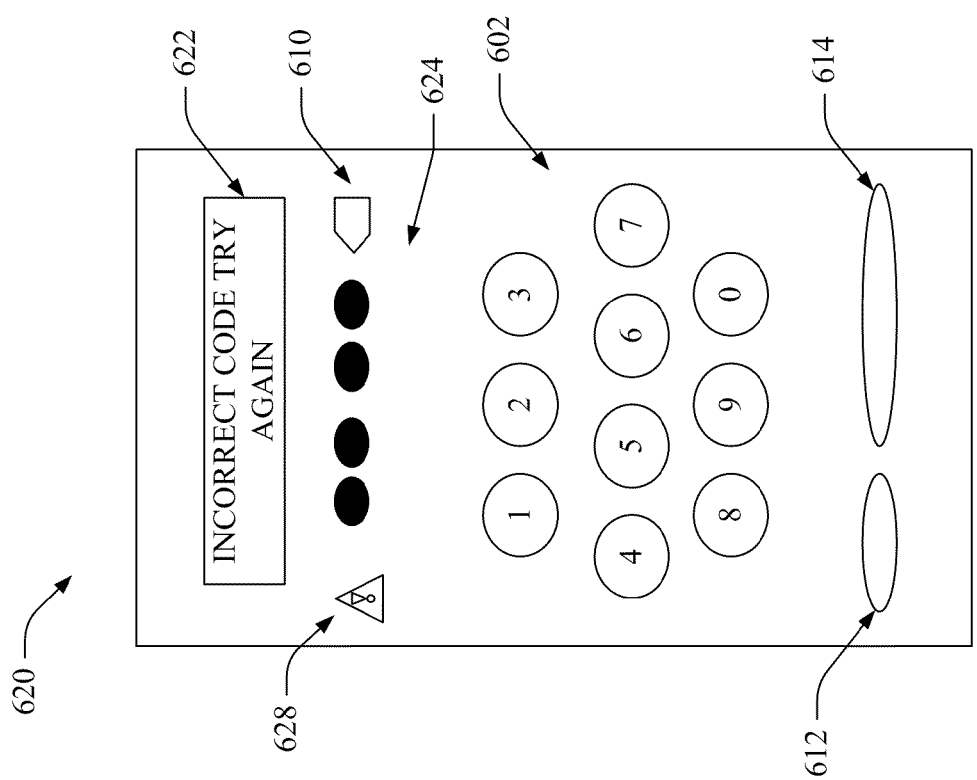
Figure 6C:
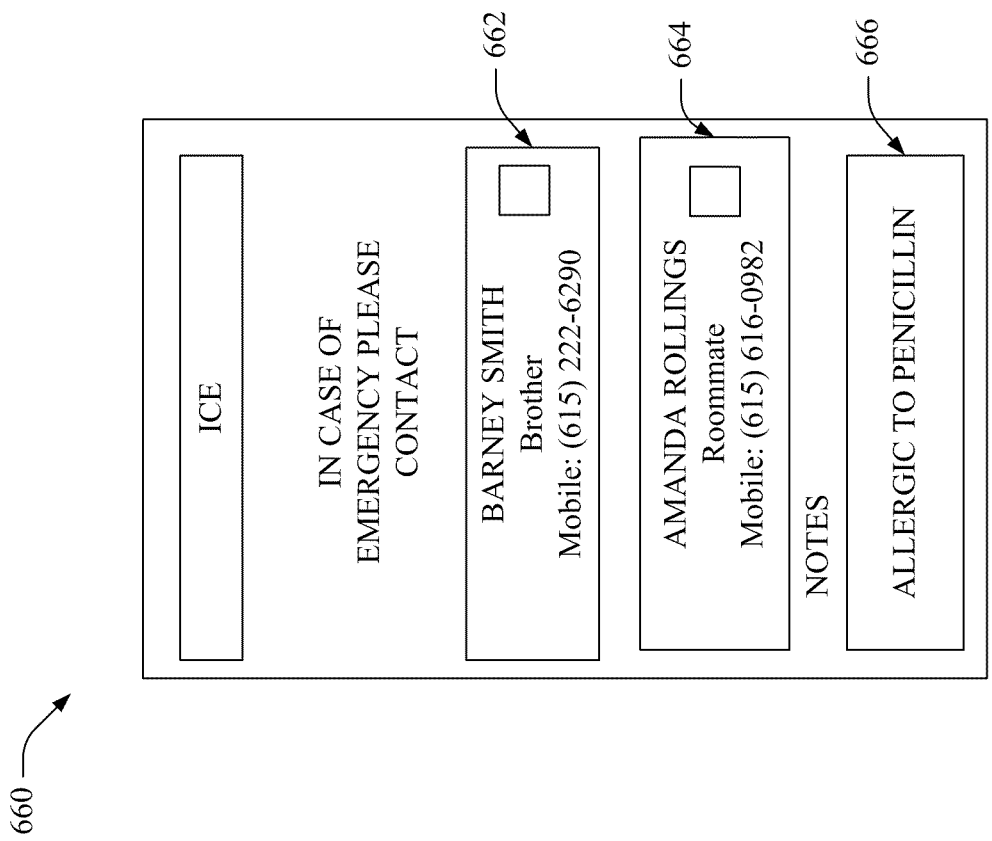
Figure 6D:
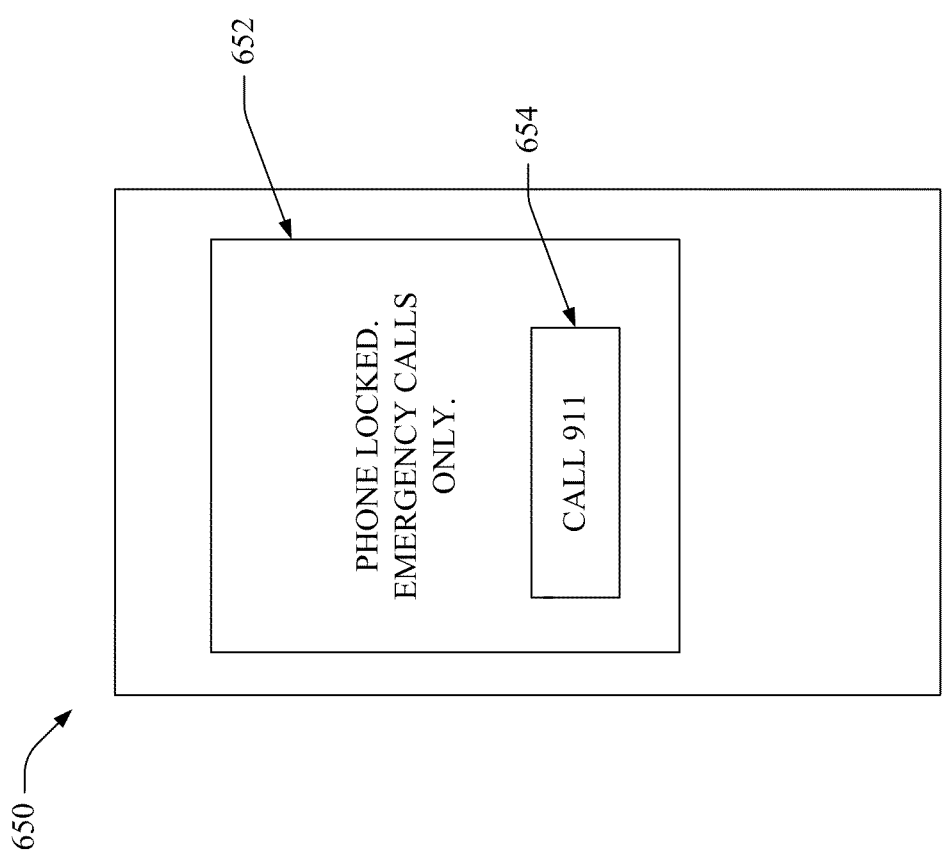

Limited access to the communication device 200 can include access to only in case of emergency (ICE) information (as shown at 660 of FIG. 6C) stored in or accessible by the communication device 200 and/or access to make an emergency 911 call (as shown at 650 of FIG. 6D).

In some embodiments, the security component 204 can implement a low security protocol. The low security protocol can include one or more steps described for providing security based on a UI screen swipe and/or other screen gestures, as described in U.S. Non-Provisional patent application Ser. No. 12/643,726, filed Dec. 21, 2009, titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY," and/or U.S. Non-Provisional patent application Ser. No. 12/902,979, filed Oct. 12, 2010, titled "LOCKING AND UNLOCKING OF AN ELECTRONIC DEVICE USING A SLOPED LOCK TRACK."

In some embodiments, implementing the low security protocol can include displaying low security information. The low security information can include a display having a first region associated with an unlocked state of the UI and a second region associated with a locked state of the UI. The first region and the second region can be non-overlapping and arranged in any number of locations relative to one another including, but not limited to, vertically stacked, horizontally- or diagonally-arranged or the like. Further, the first region and the second region can be contiguous regions and/or non-contiguous regions in various embodiments.

In some embodiments, upon detection of the communication device event, the security component 204 can initiate a security protocol that includes one or more of the above-described low security protocols followed by the high security protocol upon successful completion of the low security protocol. As described above, with regard to the high security protocol, the security component 204 can be configured to unlock the communication device 200 if the security component 204 determines that the entry corresponds to the security access information.

Figure 7:
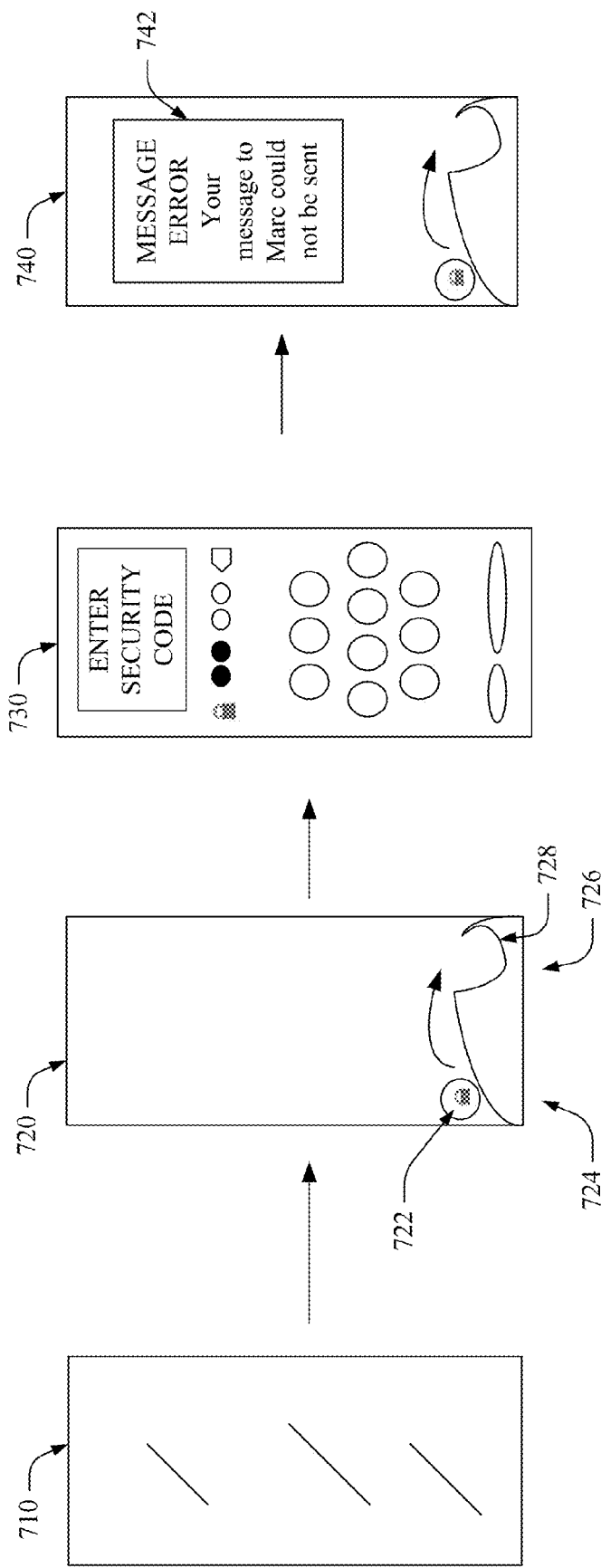
FIG. 7 is an exemplary flow diagram illustrating display regions of a user interface facilitating low and high security protocols for a communication device in accordance with various aspects and embodiments described herein.
Figure 8A:
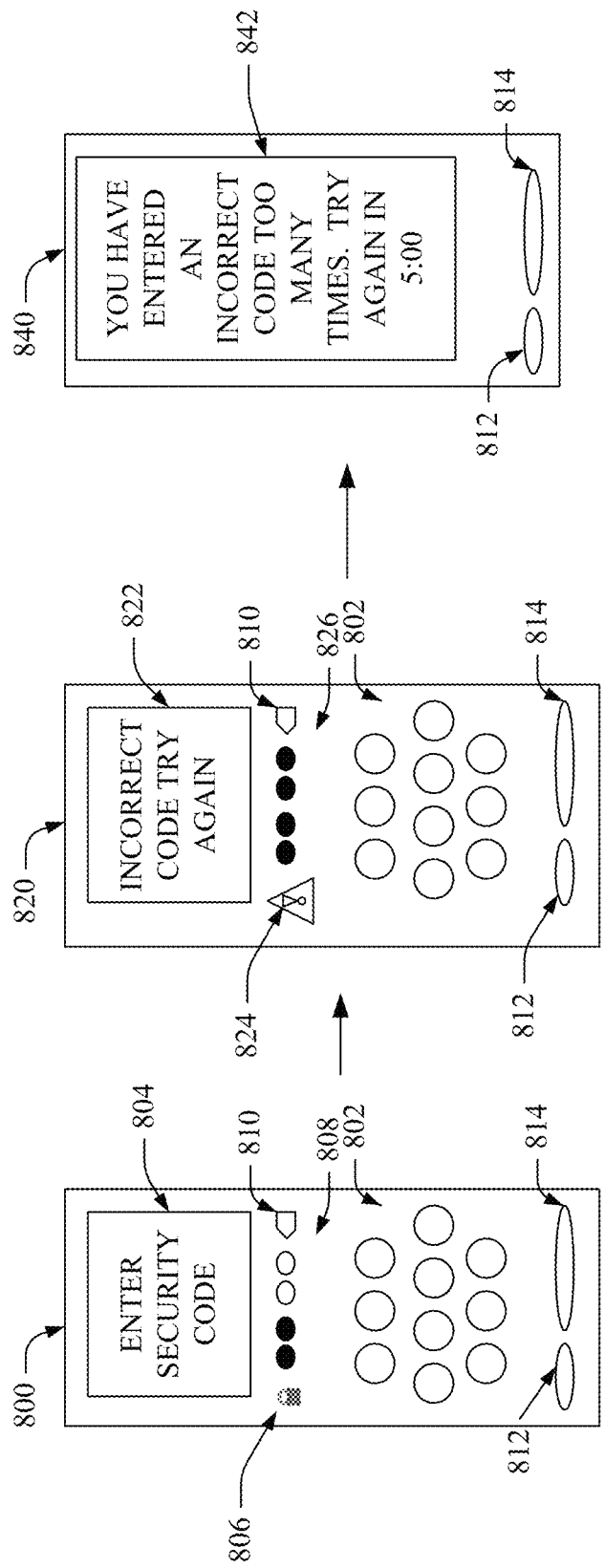
FIGS. 8A and 8B are exemplary flow diagrams illustrating display regions of a user interface facilitating high security protocols for a communication device in accordance with various aspects and embodiments described herein.
Figure 8B:
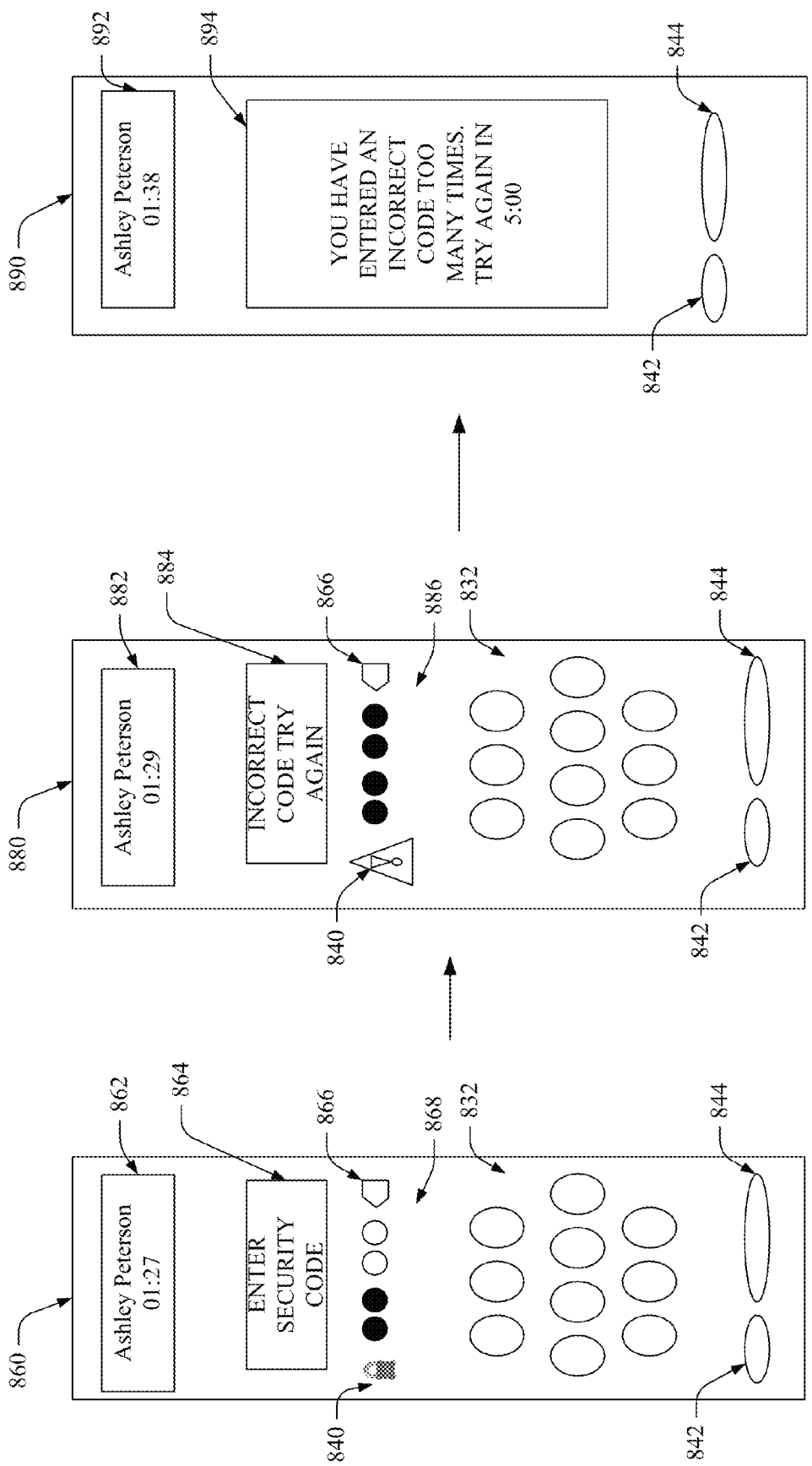

In various embodiments, the security component 204 can implement other high and/or low security protocols as described herein with reference to the flow diagrams shown at FIGS. 7, 8A, 8B and/or with reference to methods 300, 400, 500.

Figure 3:
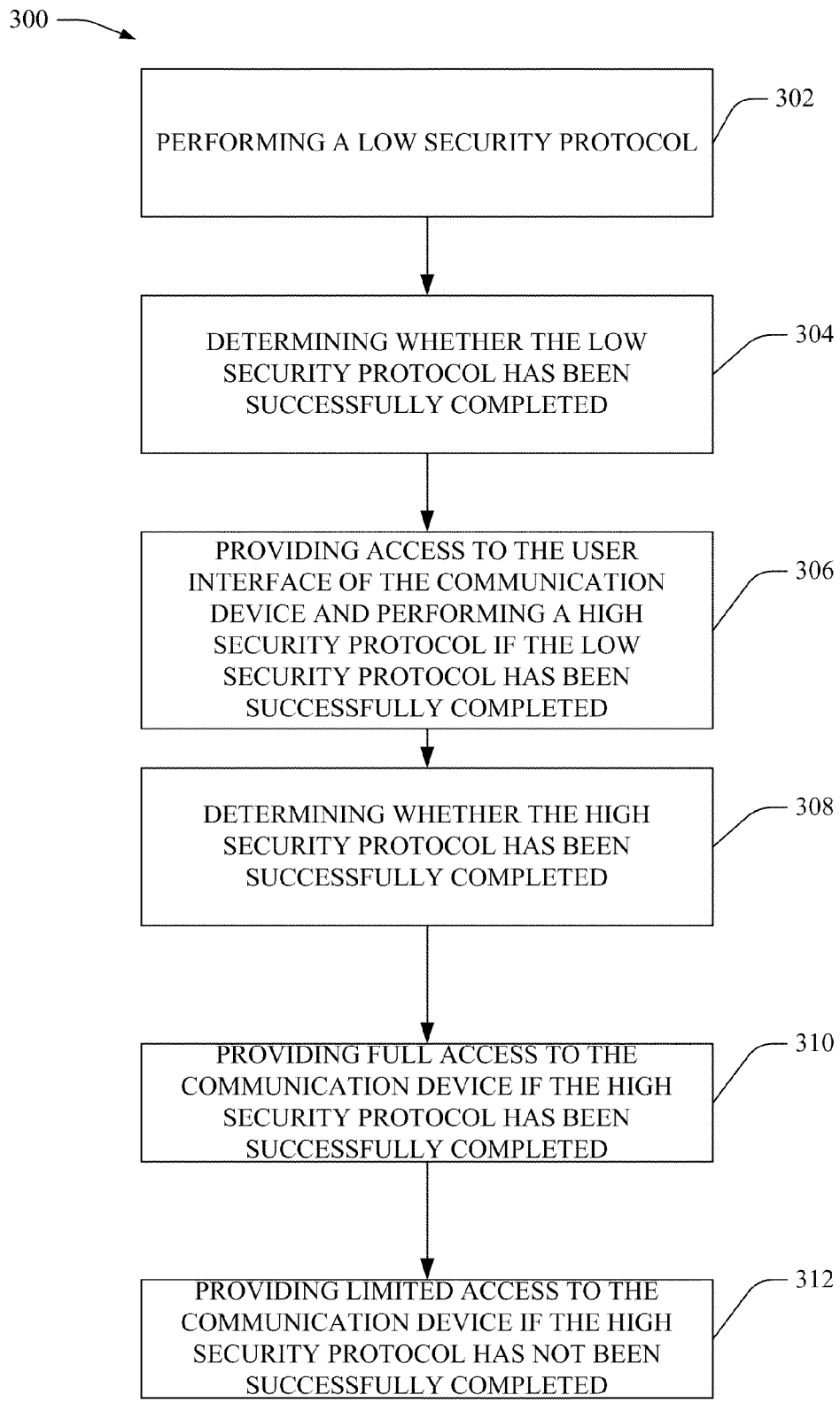
FIGS. 3, 4 and 5 illustrate flowcharts of exemplary methods for security provisioning at a communication device in accordance with various aspects and embodiments described herein.
Figure 4:
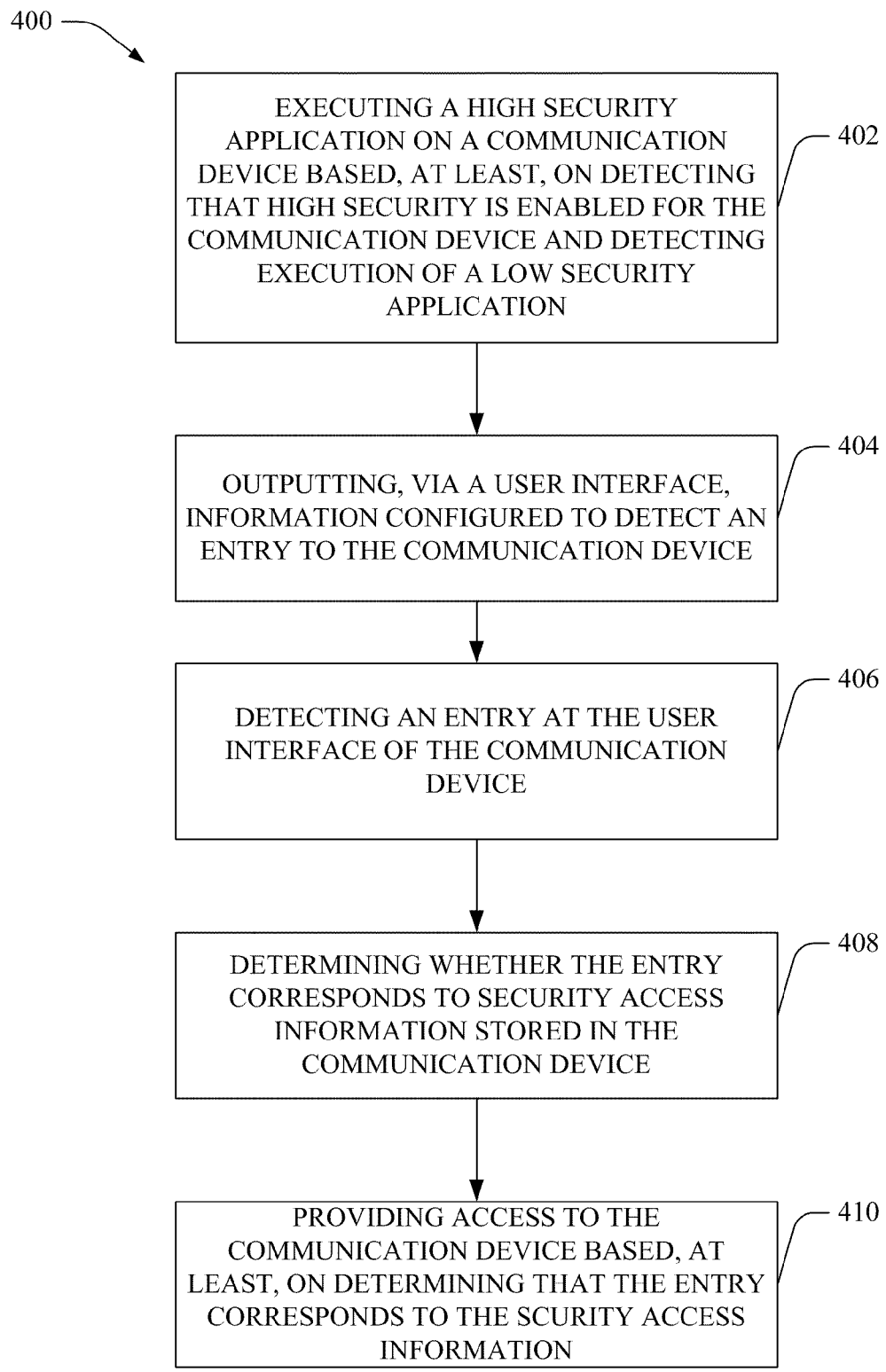
Figure 5:
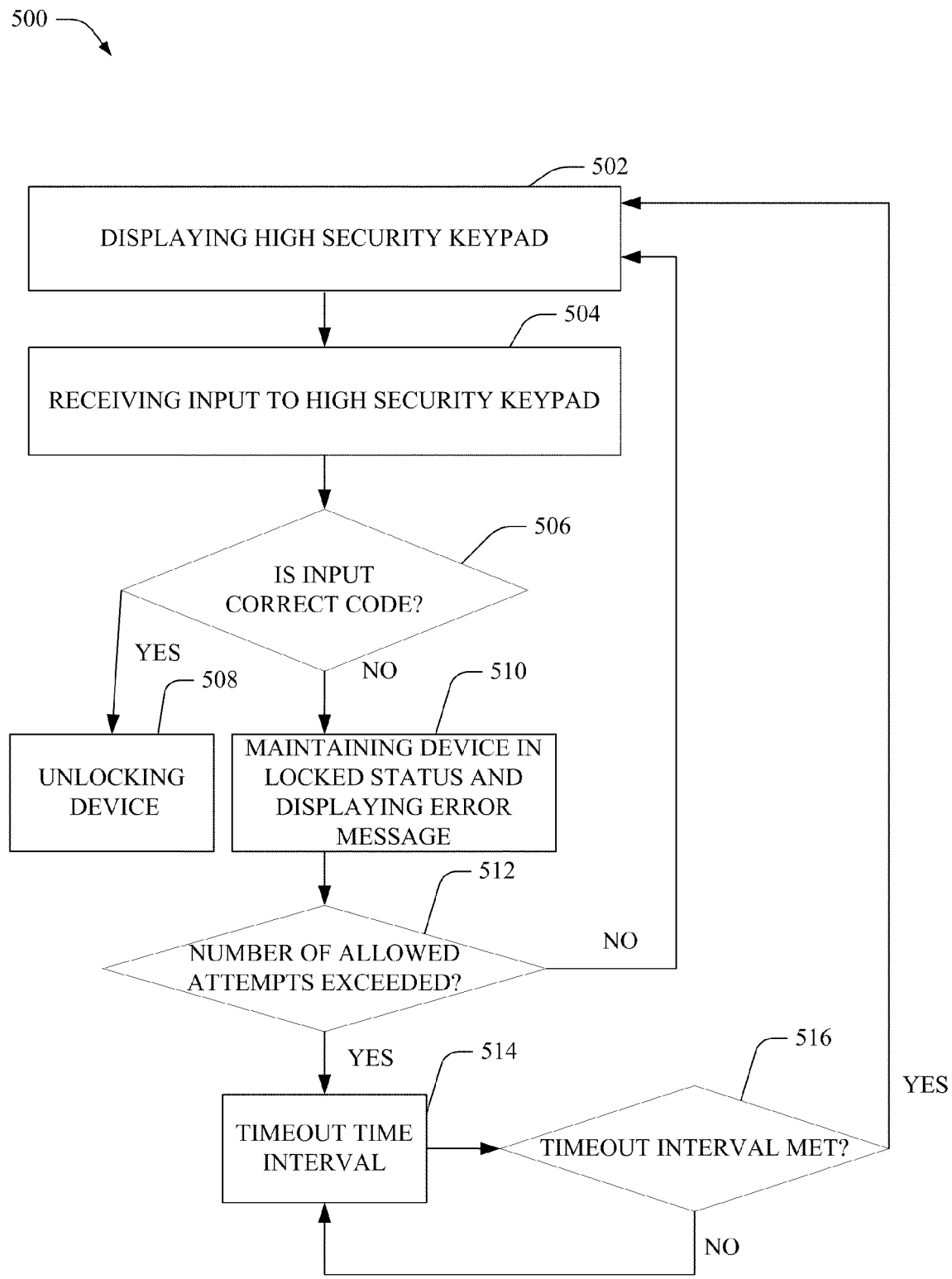

Turning first to methods 300, 400, 500, FIGS. 3, 4 and 5 illustrate flowcharts of exemplary methods for security provisioning at a communication device in accordance with various aspects and embodiments described herein. In various embodiments, security provisioning can be controlled and/or implemented by the security component 204 described with reference to FIG. 2.

Referring first to FIG. 3, at 302, method 300 can include performing a low security protocol. In some embodiments, the low security protocol can be initiated upon the communication device powering on, the power key being depressed and/or the backlight of the communication device turning off or on.

At 304, method 300 can include determining whether the low security protocol has been successfully completed. In some embodiments, low security protocol has been successfully completed if a satisfactory gesture at the UI has been detected.

At 306, method 300 can include providing access to the UI of the communication device and performing a high security protocol if the low security protocol has been successfully completed. In various embodiments, providing access to the UI of the communication device includes one or more of: allowing a user of the communication device to provide an entry to the communication device for attempted satisfaction of the low security protocol if high security is enabled, displaying alarms and incoming call notifications via the UI, and/or providing full access to the communication device (including, but not limited to, providing access to the functions described below at step 310) if high security is not enabled.

In various embodiments, performing the high security protocol can include displaying information for the high security protocol such as that shown at FIG. 6A. The screen can be a pop-up screen in some embodiments or an overlay over pre-existing information in some embodiments.

In one embodiment, the information for the high security protocol and the information for the low security protocol can be subsequently displayed in the same pop-up screen of the communication device. Initially, the pop-up screen can display the information for the low security protocol.

After receiving a satisfactory swipe at a screen associated with the low security protocol, the display of the pop-up screen can change to the information for the high security protocol. After receipt of an entry at the information for the high security protocol, the pop-up screen can display an error message if an entry matching the security access information is not received, display a screen corresponding to the previous state of the communication device prior to locking if an entry matching the security access information is received and/or display a call action screen if an entry matching the security access information is received and the communication device received an entry indicating that a non-emergency call was being attempted by the user prior to unlocking the communication device.

In some embodiments, after the communication device has displayed the information for the high security protocol for a predetermined amount of time, the communication device can move to a sleep state. In some embodiments, the predetermined amount of time is 15 seconds.

When high security is not enabled, in some embodiments, if there is an incoming call, the call can be answered on the communication device after the communication device determines that the low security protocol has been successfully completed.

At 308, method 300 can include determining whether the high security protocol has been successfully completed. The high security protocol can be determined to be successfully completed if an entry at the communication device matches or corresponds to security access information stored in or accessible by the communication device.

At 310, method 300 can include providing full access to the communication device if the high security protocol has been successfully completed. In various embodiments, full access to the communication device can include, but is not limited, access to make emergency and non-emergency telephone calls, access to send and receive messages including, but not limited, text messages, email messages and/or quick reply messages, access to all contacts information stored in or accessible by the communication device and/or access to set alarms.

At 312, method 300 can include providing limited access to the communication device if the high security protocol has not been successfully completed. In some embodiments, providing limited access can include denying access to various functions. In various embodiments, limited access to the communication device can include, but is not limited to, providing only access to ICE information, providing access to making emergency calls, displaying or otherwise outputting alarm and other notifications.

In various embodiments, while the communication device 200 and/or UI are locked, various notifications can be provided via pop-up screen. The content displayed on the pop-up screen can be contextual. The content and actions that can be taken upon displaying the pop-up screen can vary depending on a number of factors including, but not limited to, the screen displayed on the communication device 200 prior to displaying the pop-up screen, whether the communication device 200 has been navigated to a particular application and/or the type of messaging content for which the communication device 200 is providing a pop-up screen.

Figure 9A:
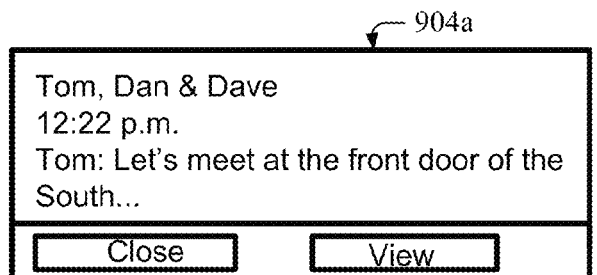
Figure 9B:
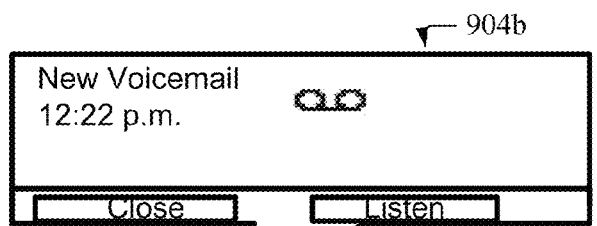
Figure 9C:
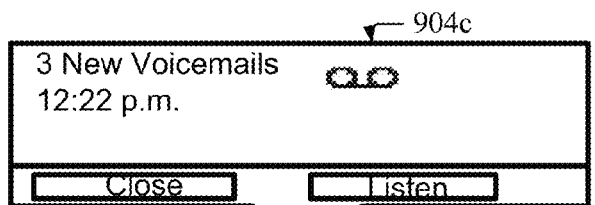
Figure 9D:
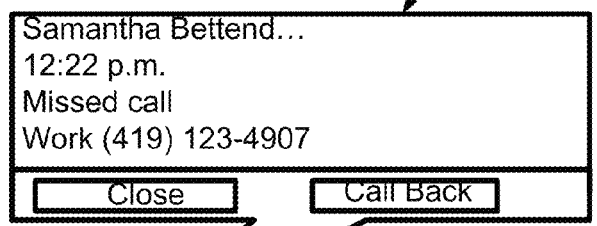

For example, with regard to the screen displayed on the communication device 200 prior to displaying the pop-up screen, if the communication device 200 is displaying the home screen, the pop-up screen can display a display region such as that shown at FIG. 9A, providing a first button or icon that can be activated for viewing greater detail regarding the alert for which the pop-up screen has been provided, and/or a second button or icon for closing the pop-up screen.

As another example, with regard to the screen displayed on the communication device 200 prior to displaying the pop-up screen, if the communication device 200 has been navigated to a particular application, as shown in FIGS. 9A, 9B, 9C and 9D, the pop-up screen displays buttons or icons that can be activated to enable the user of the communication device to close the pop-up screen or take further action relative to the type of notification being displayed. For example, with regard to FIGS. 9B and 9C, because information indicative of one or more new voicemails is being displayed, the pop-up screen can enable the user to close the pop-up screen or listen to the voicemails. As another example, with regard to FIG. 9D, because information indicative of a missed call is being displayed, the pop-up screen can enable the user to close the pop-up screen or return the call of the caller of the missed call.

As another example, with reference to FIG. 9A, when the communication device 200 and/or UI are unlocked, the buttons or icons provided can enable the user to take further action. The buttons or icons can be so labeled according to the actions possible and include, but are not limited to, buttons or icons enabling the user to close the pop-up screen or reply to the message received (for cases when a text message is being displayed on the pop-up screen).

FIGS. 9E, 9F, 9G, 9H and 9I illustrate additional display regions of the communication device 200 illustrating alerts and/or notifications provided while the communication device 200 and/or UI is locked. The display regions illustrate a low battery notification (FIG. 9E), an incoming call notification when a photo for the caller is not stored on the communication device 200 (FIG. 9F), an incoming call notification when a photo for the caller is stored on the communication device 200 (FIG. 9G), a text message notification (and, in some embodiments, as shown, including a notification of a number of new messages) (FIG. 9H), and a system notification (FIG. 9I).

Referring back to FIG. 3, in some embodiments, method 300 can include resuming (not shown) the last state of the communication device prior to the UI and/or communication device locking, and displaying such corresponding screen that corresponds to the last state prior to the screen locking. In some embodiments, if the user was trying to navigate away while a call was in progress, the user can be allowed to navigate away from the screen indicating a call in progress.

Turning now to FIG. 4, at 402, the method 400 can include executing a high security application on a communication device based, at least, on detecting that high security is enabled for the communication device and detecting execution of a low security application.

In some embodiments (not shown), executing the high security application can be further based on detecting a communication device event. The communication device event can comprise at least one of an activation of a hard key of the communication device, initiation of a boot sequence associated with the communication device, illumination of a backlight of the communication device or movement of a physical keypad associated with the communication device, wherein the communication is a mobile hand-held communication device.

At 404, the method 400 can include outputting, via a UI, information configured to detect an entry to the communication device. In some embodiments, the UI can be a touch screen. The information displayed can be a hexagonal keypad. Detecting the entry can include detecting at least one of a numeric entry or an alpha entry at the hexagonal keypad such as that shown in FIG. 6A.

A more detailed description of FIG. 6A is as follows. Information 600 can include a keypad 602. In some embodiments, as shown, the keypad 602 can have an outer perimeter that is hexagonal in shape. In other embodiments, the keypad 602 can be any number of shapes including, but not limited to, circular, square, triangular, rectangular, or the shape of any other polygons. The keypad 602 can include buttons displaying numeric information (as shown) or alpha information.

In various embodiments, the keypad 602 can include buttons or icons on associated with various regions that correspond to alpha or numeric characters. The regions can overlap with the circular regions shown in FIG. 6A and associated with numerals "1", "2", "3", "4", "5", "6", "7", "8", "9" and "0". In some embodiments, the regions can be non-overlapping regions that do not overlap with other regions on the keypad 602 and that cover at least the region identified by the buttons or icons corresponding to the numerals shown (or alpha characters, in other embodiments). While circular regions are shown for the buttons or icons, any number of different types of shapes can be associated with the regions corresponding to numerals "1", "2", "3", "4", "5", "6", "7", "8", "9" and "0". For example, the buttons or icons can be indicated by squares, triangles or any other polygons, surrounding a numeral.

The keypad 602 can be displayed for access after the UI is unlocked. As such, the UI for the communication device can first be unlocked and then the keypad 602 can be displayed to enable unlocking the communication device 200 itself. Unlocking the communication device 200 can include providing full access to the functions of the communication device described herein including, but not limited to, creating, viewing the full content of, setting and/or replying to messaging, contacts, notifications, alarms, social media access, triptych UI access and the like.

The information 600 can also include a text box 604 for displaying messages, including, but not limited to, messages instructing the user to enter a security code, that the entered code is incorrect or does not match or correspond to the security access information (as shown at 622 of FIG. 6B), a time remaining in the timeout state (as shown at 842 of FIG. 8A), an error message (as shown at 742 of FIG. 7), information indicative of an ongoing conversation on the communication device (as shown at 862, 882, 892 of FIG. 8B) and/or any other information to provision security on the communication device 200.

Referring back to FIG. 6A, the display region 600 can also include status information including, but not limited to, a lock icon 608 associated with a lock status of the communication device 200, a button or icon 610 able to be activated to delete an entry to the UI of the communication device 200 in whole or in part, and/or a set of entry status icons configured to become illuminated to indicate whether an entry has been completely received. For example, if an entry is four digits, the entry status icons 606 can illuminate completely when the fourth digit is received while illuminating one entry status icon 606 or less than one of the set of entry status icons 606 if less than the entire entry of four digits has been received.

The status icons 606 can illuminate one or more at a time as the keypad 602 is receive entries from the user. The entry can be any number of digits. In some embodiments, the entry is four digits. By way of example, but not limited, the entire plurality of status icons 606 can be illuminated when the number of keypad 602 buttons or icons activated corresponds to the number of digits in the security access information. In some embodiments, the number key depressed or tapped highlights while pressed and a next one of the plurality of status icons 606 illuminates.

With regard to the delete button or icon 610, the delete button or icon 610 can be in the shape as shown in FIG. 6A or otherwise, and is able to be activated or depressed or tapped or voice instruction, to delete one or more entries entered on the keypad 602. In some embodiments, when the delete button or icon 610 is activated, the communication device can display the information associated with the high security protocol having the state when all digits entered are cleared and no status icons 606 are illuminated.

In various embodiments, the lock icon 608 can be changeable to display a locked status with a first image and an unlocked status with a second image. For example, the lock icon 608 can be configured to display a first image based, at least, on the security component 204 unlocking the communication device, and a second image prior to the security component 200 unlocking the communication device. The second image can also be an image indicating that an incorrect code has been entered, such as the alert icon at 628 of FIG. 6B.

In some embodiments, the communication device can vibrate or emit an audible signal in addition to or in lieu of changing the lock icon 608 (of FIG. 6A) to an alert icon 628 (of FIG. 6B). In some embodiments, the information for the high security protocol can output a message indicating that the incorrect code is entered such as that shown at 622 of FIG. 6B.

The information 600 can also include an in case of emergency (ICE) button 612 to display any ICE information stored in or accessible by the communication device 200 and/or an emergency call button 614 to initiate an emergency 911 call. ICE can be the international standard that helps paramedics or emergency responders contact the people designated as emergency contacts. An ICE contact card can be a special entry in the contact list. The ICE contact screen can display the contact name, relationship, telephone number and/or notes useful to emergency personnel such as notes re allergies, medications, other information related to the health of the user of the communication device, and the like.

Referring back to FIG. 4, after 404 at which method 400 outputs information to detect an entry to the communication device, at 406, the method 400 can include detecting an entry at the UI of the communication device.

At 408, the method 400 can include determining whether the entry corresponds to security access information stored in the communication device.

At 410, the method 400 can include providing access to the communication device based, at least, on determining that the entry corresponds to the security access information. In some embodiments, if the entry does not correspond to the security access information, the method can include providing (not shown) limited access or no access to the communication device.

In these cases, the method can also include determining a number of times that an entry that does not correspond to the security access information has been detected at the communication device; and initiating a timeout state of the communication device in which no access or limited access to the communication device is provided, based, at least, on determining that the number of times exceeds or equals a predetermined maximum number of times for attempted access to the communication device.

In some embodiments, method 400 can also include executing (not shown) a low security application prior to executing the high security application. In some embodiments, executing the low security application can include: displaying, via the UI, a first region associated with an unlocked state of the UI and a second region associated with a locked state of the UI. The low security protocol can also include detecting a swipe gesture from the second region to the first region. The low security protocol can also include unlocking the UI of the communication device based on detecting the swipe gesture. Unlocking the UI of the communication device can include, in some embodiments, maintaining the communication device in a locked state while unlocking the UI of the communication device.

Referring to FIG. 5, method 500 can be as follows. At 502, method 500 can include displaying a high security keypad. At 504, method 500 can include receiving input to the high security keypad. At 506, method 500 can include determining whether the input is the correct code for unlocking the communication device.

If the input matches the code for unlocking the communication device, at 508, method 500 can include unlocking the communication device. If the input does not match the code for unlocking the communication device, at 510, method 500 can include maintaining the communication device in a locked state. In some embodiments, step 510 also includes displaying an error message. The error message can notify the user that the input entered is not correct.

At 512, the method 500 can then include making a determination as to whether the number of allowed attempts for entering an accurate entry have been exceeded or met. For example, in some embodiments, the allowed number of attempts is five attempts. With reference to FIGS. 1 and 2, the number of attempts can be pre-programmed in the memory 208 and/or data store component 224 of the communication device 200 and/or received or accessed from a setting stored in the core network 106. In various embodiments, the number of attempts can be stored in storage of the communication device 200 not associated with or included in the subscriber identity module (SIM) of the communication device 200.

If the number of attempts have not been exceeded or met, method 500 can go back to step 502 and the high security keypad can be displayed. If the number of attempts has been exceeded or met, at step 514, method 500 can include the communication device 200 entering a timeout state. In the timeout state, the communication device 200 limits the entries upon which the communication device 200 takes action.

In some embodiments, the emergency call button shown at 654 of FIG. 6D can be activated to place an emergency call and/or the ICE emergency contacts shown at 660 of FIG. 6C can be viewed by activating the ICE button whether the communication device is in the locked state or unlocked state. The ICE contact cards can provide a plethora of information that can be accessed while the communication device is locked. An example of an ICE card can be as shown in FIG. 6B while an example of an emergency call screen can be as shown in FIG. 6D.

While in the locked state, one or more of the hard keys of the communication device can be disabled except the power key, and any keys that can initiate an emergency call (using a UI display such as that shown at FIG. 6D) or display of ICE information (using a UI display such as that shown at 6C). In some embodiments, the hard keys that would invoke other applications can be disabled.

The communication device 200 can be in the timeout state until the timer counts down to zero from the time designated for the timeout state. In some embodiments, the communication device 200 can display the ICE emergency contacts and/or initiate the emergency call upon the communication device 200 detecting that a back key is activated.

At 516, method 500 can include determining whether a required timeout interval has been met. After a designated amount of time for the timeout state has been met or exceeded, the communication device 200 can go back to method step 502 only after a designated amount of time. In some embodiments, the designated amount of time is five minutes. The designated amount of time can be pre-programmed in the memory 216 of the communication device 200 and/or received or accessed from a setting stored in the core network 106. In various embodiments, the designated amount of time can be stored in storage of the communication device 200 not associated with or included in the subscriber identity module (SIM) of the communication device 200. While in the timeout state, the communication device 200 prevents all entry to the keypad except those entries for making an emergency call.

In some embodiments, in the timeout state a message is output from the communication device indicating the timeout state and/or the designated amount of time for the timeout. The keypad can also be removed from display to prevent the user from attempting to enter text at the keypad. The communication device 200 can display the timer or a countdown illustrating the amount of time remaining in the timeout state. In some embodiments, the hard keys can be disabled and only the power hard key can be enabled, during the timeout state. In some embodiments, step 516 can go back to step 502 and illustrate the keypad to enable the user to re-enter the entry.

At 514, the method 500, if the timeout interval has not been met, the timeout time interval continues and the communication device 200 remains in the timeout state.

Again, FIGS. 6A, 6B, 6C and 6D illustrate block diagrams of display regions of UIs for security provisioning at a communication device in accordance with various aspects and embodiments described herein. FIG. 6A illustrates a display region prompting a user to enter a security code during implementation of a high security protocol for the communication device.

FIG. 6B illustrates a display region outputting an incorrect code message and providing an alert icon corresponding to the message. FIG. 6B is an example of a display region output from the UI when a code that does not match or correspond to the security access information is entered by the user and received by the communication device.

FIG. 6C illustrates a display region detailing exemplary ICE information stored in or accessible by the communication device. As shown, ICE information can include emergency contacts and/or medical or allergy information for the owner of the communication device. FIG. 6C can be displayed and accessed notwithstanding the high security protocol has not been successfully completed and the communication device is locked.

FIG. 6D illustrates a display region detailing an exemplary emergency call display for initiating an emergency 911 call. FIG. 6D can be displayed and accessed notwithstanding the high security protocol has not been successfully completed and the communication device is locked.

FIG. 7 is an exemplary flow diagram illustrating display regions of a UI for facilitating low and high security protocols for a communication device in accordance with various aspects and embodiments described herein. As shown in FIG. 7, the display region can initially display a blank screen 710 prior to initiation of any security protocol. Upon power-up of the device, the low security protocol can be initiated and the display region 720 can be as shown.

The display region 720 can include an icon 722 configured to be dragged, swiped or flicked from the second region 724 to the first region 726 and into or within close proximity to an arc-designated region 728 within the first region 726. Upon detection that the icon 722 has been moved to the first region 726, the security component 204 and/or any other suitable component in or accessible by the communication device 200 can control the UI to unlock. In some embodiments, the UI component 202 can control the UI to unlock, to lock or to remain locked or unlocked. In some embodiments, the icon 722 can be a changeable icon that changes image from an image indicating that the UI is locked to an icon 722 showing that the UI is unlocked.

Referring back to FIG. 7, as shown in the flow diagram, upon successful completion of the low security protocol, if high security is enabled, the UI can display a display region 730. Display region 730 displays one embodiment of the information associated with the high security protocol. The information shown at FIGS. 6A, 6B, 6C and 6D, and previously described are other embodiments of display regions associated with the high security protocol can be displayed.

As also shown at FIG. 7, in the embodiments wherein the user attempts to send a message prior to the high security protocol being successfully completed, a display region can be displayed on the UI informing the user of limited or no access to the communication device 200 and/or prompt the user to make an entry on the UI according to a low or high security protocols. In some embodiments, as shown at display region 740, the display region 740 can illustrate an error message 742 informing the user that the attempted message could not be sent.

In embodiments wherein the relationship between the low security protocol and the high security protocol is to return to the low security protocol if actions are attempted prior to completion of the high security protocol, and/or if an incorrect code is entered for the high security protocol, the display region associated with the low security protocol can include the display region 720 and the display region 740 during concurrent or simultaneous time periods.

However, and referring to FIGS. 8A and 8B, in embodiments wherein the relationship between the low security protocol and the high security protocol is to continue to execute the high security protocol if actions are attempted prior to completion of the high security protocol, and/or if an incorrect code is entered for the high security protocol, the display region associated with the low security protocol can also include one or more of the display regions 820, 840, 860, 880, 890 as described below.

Referring back to FIG. 7, in some embodiments, the low security protocol can enable access to the screen or other UI of the communication device 200 while the high security protocol can enable access to the remaining functions of the communication device including, but not limited to, dialing non-emergency calls, accessing contact information other than in case of emergency contact information, retrieving social media information for the user or third-parties associated with the user, setting alarms and the like.

FIGS. 8A and 8B are exemplary flow diagrams illustrating display regions of a UI for facilitating high security protocols for a communication device in accordance with various aspects and embodiments described herein.

Referring to FIG. 8A, a flow diagram for the high security protocol can include, at 800, displaying a high security keypad for entry of a code. At 820, the flow diagram can include generating a message indicating that an incorrect code has been entered. At 840, the flow diagram can include generating a message indicating that an incorrect code has been entered too many times, indicating that the communication device is entering a timeout state and/or entering a time period in which the communication device will timeout and limited or no access will be provided to the communication device.

In some embodiments, FIG. 8B can be a flow diagram displaying a method that can be employed when a user tries to make a new call while high security protocol is enabled and the high security protocol has not be successfully completed. The call notification can be a notification of an ongoing call in various embodiments. When the call is in progress and the screen locks and communication device detects a button being activated to attempt to navigate to a new screen (and the button is not the button for turning the power off on the phoned), the communication device can display the display region 860. If the communication device receives an entry and the entry does not match the entry, the communication device can display the display region at 880 with an error message as shown at block 884. If the communication device detects a number of entries that exceeded the accepted number of entries for entering the entry, the communication device can enter the timeout state as discussed herein and display the display region 890 and display message 894. During the timeout state, the communication device cannot navigate away from the timeout screen until the timer counts down to zero.

While the indicia of the ongoing conversation can be provided while the communication device is in a locked state, the communication device can limit new calls that can be initiated to only emergency calls. In some embodiments, when a call is in progress, the communication device can be in an active call screen state. In these embodiments, instead of locking, the communication device can place the UI and/or communication device in a sleep mode. When the user attempts to navigate away from the active call screen, the communication device can display the message instructing the user to enter a security code (as shown at display region 860).

In various embodiments, the UI text box 862, 882, 892 can be displayed when an incoming call is being received at the communication device and the communication device is in the low security locked state and/or high security locked state.

In some embodiments, if there is an incoming call, and there is an entry stored in or accessible by the communication device, high level security is in place and the screen shown as display region 860 is displayed after the communication device detects a satisfactory swipe at the low security gesture screen. In some embodiments, the incoming call notification can also be displayed to alert the user to the incoming call. The incoming call notification can be displayed as an overlay on one or more portions of the display region 860 and/or output as a sound or vibration from the communication device. The communication device can receive an entry at the display region 860 and, if the entry matches the entry, unlock the communication device. After the communication device is unlocked, the call can be answered on the communication device.

As another example, if the communication device transmits a notification relating to an application and comprising a subset of information to the communication device, and the application is identified as being associated with a low security level (e.g., as specified by the application or the security component 204) and the communication device is associated with a low security level (e.g., the security level relating to functions, applications, or operations of the communication device is set to a low security level), the security component 204 can identify the security level as low and can facilitate display of the received subset of notification information in the overlay display region of the UI or can desirably filter the received subset of information to facilitate filtering out portions (e.g., amount and/or type of information) of the received information for which display in the overlay display region is not desired (e.g., for reasons of available space in the overlay display region), and the security component 204 can facilitate display of a low-security-authorized subset of information relating to the notification in the overlay display region of the UI, in accordance with the predefined security criteria. For instance, the amount and/or types of information displayed in the overlay display region when the security component 204 identifies the security level as low can be more information, more types of information, and/or more detailed information than the amount and/or types of information displayed in the overlay display regions when the security component 204 identifies the security level as high, to facilitate securing sensitive or personal information, which can have a high security level, when desired.

Referring back to FIG. 2, the foregoing describes mere exemplary embodiments of security provisioning possible at the communication device 200 as implemented and/or controlled by security component 204 in particular and/or the communication device 200 in general.

In various embodiments, the communication device 200 can include a notification component 212. The notification component 212 can be configured to generate notifications from the communication device 200. The notification component 212 can be configured to automatically re-size notifications to fit the screen size for the communication device 200 in landscape (or portrait) orientation and/or based on whether a media is attached to the notification. For example, if media is attached to a notification, the media can be re-sized for presentation in a particular orientation.

The notification component 212 can also receive one or more notifications from one or more communication devices (e.g., mobile communication devices, application servers, social networking sites, etc.) or generate notifications relating to local applications (e.g., electronic calendar application, alarm clock application, etc.). The notification component 212 also can facilitate processing the received or generated notifications and associated notification-related information to facilitate presenting the notification and/or desired notification-related information to the communication device user via the UI (e.g., overlay display region) and/or associated UI components (e.g., speakers, vibration generator, etc.).

In various embodiments, notifications can include, but are not limited to, notifications indicating an alarm, missed alarm, message quick reply, a new message notification, low battery power, mute state, incoming call, volume, and/or system notifications. In various embodiments, the alarms and other notifications can be displayed or otherwise output from the communication device 200, and/or incoming calls can be received on the communication device 200, while the communication device 200 is in the timeout state.

In some embodiments, incoming call notifications indicate an incoming call to the communication device. In some embodiments, the incoming call notification pauses the active application and overlays the current screen displayed on the communication device 200. The notification can include a number of components including, but not limited to, conversation name (e.g., caller's name as provided in the contact list for the communication device 200), conversation number (e.g., caller's phone number), image associated with the caller (e.g., profile photo in contacts of communication device 200 or any other image associated with the caller), ignore button (which can send the call to voicemail and displays the call as missed and read in the conversation list) and/or answer button (which can answer the call).

A message quick reply notification provides a display notifying a user of the communication device of a received message. The communication device 200 can display the message (or at least a portion of the message) while the communication device 200 is locked. However, while the communication device 200 and/or the UI are locked, the user is unable to control the communication device 200 to act on the message. As such, the notification and/or message and/or alert can be merely viewed. Additional actions such as viewing the complete message (in embodiments wherein only a portion of the message is displayed while the communication device 200 and/or the UI is locked), placing a call in association with the notification, etc. cannot be performed unless the communication device 200 and/or the UI is unlocked. The communication device 200 and UI can be unlocked in accordance with embodiments of security protocols described and/or incorporated herein.

Upon unlocking, in some embodiments, the entirety of the content of a SMS or MMS message can be displayed. The quick reply message can include a text field for entering text to respond to a quick message.

A new message notification can include a conversation name (as provided in contacts, if any), a timestamp indicating the time that the call is received, message content including, but not limited to, media and/or text, reply button to respond to the new message with a quick reply and/or close button to close the notification and return to the communication device last state prior to receiving the new message notification. The conversation list can then show the message as unread if the close button is employed to close the notification.

The conversation name can indicate a group name if the message is from a group. The timestamp can also include the day received based on the timestamp rules. The media can be displayed in the screen of the notification in some embodiments. It can be scaled to fit within the notification. The media can include, but is not limited to, photos, videos, universal resource locators (URLS), contacts, location, audio. Actions on media can be performed by accessing the full conversation (as opposed to accessing the new message notification).

In some embodiments, the alarm notification displays a button that can be activated when the communication device 200 is in the locked state to enable the user to snooze or turn off the alarm without compromising the security of the communication device 200. The communication device 200 can remain in the locked state while the alarm notification is displayed or otherwise output (whether output audibly or by vibration).

In some embodiments, the volume notification includes a display of the current volume of the communication device 200 and provides a vehicle for accepting input to change the volume. The volume can be changed via volume rocker keys of the communication device in some embodiments.

The system notifications can include, but are not limited to, display of a message, display of an error (or error message), and/or button or text box or other entry mechanism for accepting a user entry at the communication device 200. The system notification can also include a "close" button (or any other button for closing the screen displayed), "yes"/"no" buttons, buttons associated with Unstructured Supplementary Service Data (USSD) messages such as instant messages, and corresponding "send" and "reply" buttons (or any other buttons for sending or replying to a message). In some embodiments, the system notifications can include a notification notifying the user that a message is undeliverable, a notification notifying the user that the power cord for the communication device is connected (or a notification notifying the user that the power cord is disconnected), a notification notifying the user that the communication device is fully charged, a notification notifying the user that a user has a message (e.g., a checked box on a display screen indicating a message received by the communication device), a notification detailing a license agreement and requiring the user to accept the terms of the agreement (e.g., a wireless internet service provider (WISPr) WiFi agreement), generic and/or customizable alarm notification output from the communication device based on calendar entries on the communication device 200, a notification notifying the user that the limit for applications installed on the communication device 200 has been reached or the user is attempting to exceed such limit, and/or a notification notifying the user of the arrival of any new communication or missed message (e.g., voicemail, missed call, text message).

In various embodiments, a notification notifying the user of the arrival of any new communication or missed message can be customized based on the type of message received or missed. Notifications can be prioritized based on importance with incoming call notifications being more important than any other notification in some embodiments. As a result, an incoming call notification can be displayed as an overlay covering in part or in whole any other notifications.

The display for the low battery notification can be output from the communication device 200 when the battery powering the communication device 200 is low. The display can change to a second display when the percent of battery power is less than a designated amount in order to communicate to the user that the battery power is critically low. The designated amount can be one percent or less of the maximum battery power.

In various embodiments, the communication device 200 can also include an overlay component 214. The overlay component 214 can control the display of an overlay of information on the UI of the communication device 200. An overlay component 214 can overlay alarms, notifications, text, icons and/or other information for the high and/or low security provisioning described herein.

In some embodiments, the overlay can be a temporary overlay that is displayed during a time interval corresponding with an event. For example, indicia of an incoming message can be overlayed over other information displayed by the UI. The indicia of the incoming message can include any information for alerting a user that an incoming message is in progress and/or for displaying information about the incoming message. In some embodiments, the incoming message can include the name, telephone number associated with the message, date of the incoming message, time of the incoming message and/or text the entirety, or a portion, of the message. The overlay can be a temporary overlay that is displayed during a time interval that is concurrent with the time that the message is incoming. In some embodiments, information or indicia of the incoming message can be overlaid on the screen. In some embodiments, on-going calls and/or the timer counting down during the timeout state can be displayed in an overlay on the screen and/or overlaid on the previous content of the screen.

In various embodiments, the overlay component 214 can overlay and display information relating to a notification (e.g., notification of an alarm, notification of an incoming phone call, notification of an incoming text message, notification of a scheduled calendar event, notification of activity relating to a social networking site) on the display screen of the UI. For example, when a notification is received, a graphic associated with the notification can be displayed as an overlay over the information associated with the high security protocol.

The communication device 200 can also include a messaging component 218 configured to control the operation of one or more messaging applications. By way of example, but not limitation, messaging applications can include text-based, voice-based, video-based and/or combination voice and audio-based applications such as text messaging, instant messaging, internet and landline telephony, and/or audio and textual voicemail communications. By way of other examples, but without limitation, messaging applications can include applications utilizing short message service (SMS), multimedia message service (MMS), instant messaging (IM) protocols and/or text over internet protocol (ToIP) messaging.

As described above, emergency 911 calls can be initiated via the messaging component 218. As such, in limited instances, the messaging component can be accessed while the security component 204 maintains the communication device 200 in the locked state. The messaging component 218 can be configured to receive inputs from the I/O component 222 and format, transmit and/or receive messaging content in response to the inputs received. The messaging content can include a threaded list of one or more messages or calls received at or transmitted from the communication device 200. The messages can be text messages, instant messages, email messages, voicemail messages or any other messages that can be provided to the user. The calls can be telephone calls communicated over PSTN networks, cellular networks and/or Internet telephony calls. The content of the messages and/or calls can be provided in bubbles or other shapes or indicia and, in some embodiments, can be associated with or displayed with an identifier of the initiator of the messaging content. In some embodiments, the messaging component 218 can facilitate creation and transmission of the quick reply described above.

The communication device 200 can also include a contacts component 216 configured to control the operation of one or more contact applications. The contact applications can provide and/or enable display, deletion or editing contacts-related information. By way of example, but not limitation, contacts-related information can include the above-described ICE information such as names and contact information of emergency contacts at 662, 664 of FIG. 6C. As shown at 666 of FIG. 6C, the ICE information can include information regarding allergies, medications and other health-related information provided by the owner of the communication device.

The contacts-related information can also include voice, email and/or geographical contact information for an individual or group in a contacts repository accessible by the communication device 200. In some embodiments, the contacts repository can be included in the data store component 224 of the communication device 200. As such, the contacts-related information can be mobile, home, work and/or fax numbers, email addresses, physical street addresses, social network identification information, a social network identification, or the like. The contacts-related information can also include information about the individual or the group including, but not limited to, biographical information such as the birthday or date of incorporation of the individual and group, respectively, favorite foods of an individual and/or other information specific to the individual or group that the user of the communication device 200 can want to access. The contacts-related information can include information that the user has stored locally on the communication device 200 (e.g., in the address book of the communication device 200) and/or that the user can access from a location that is remote from the physical location of the communication device 200.

The communication device 200 can also include a social media component 220 configured to control the receipt, aggregation, generation, output and/or filtering of social media information at the communication device 200. By way of example, but not limitation, social media information can include, but is not limited to, information associated with or output from social media feeds, blog information, chat information, instant messaging information, and the like. The social media information can be displayed in any number of arrangements including, but not limited to, the subject matter of the social media feed, the social networking site from which the social media feed is provided and/or the chronological order of the social media feeds. In some embodiments, the social media information can include comments posted (or a number of comments posted) in association with one or more social media feeds for the individual. In some embodiments, one or more comments can be shown on the UI with the one or more feeds. The social media applications can include applications that provide social media feeds, news feeds and wall postings from FACEBOOK®, activity updates (e.g., tweets) from TWITTER® or other information from social networking sites such as MYSPACE®, websites of interest and the like.

In various embodiments as described herein and with reference to any number of different applications including, but not limited to, a messaging application, a contacts application and/or a social media application, where an entity, person or individual is discussed, the entity, person or individual can be a legal or natural entity, person or individual. Similarly, in various embodiments as described herein and with reference to any number of different applications including, but not limited to, a messaging application, a contacts application and/or a social media application, where an entity or group is discussed herein, the entity or group can include one or more legal or natural entities, persons or individuals. By way of example, but not limitation, an entity or group could be an organization, a business entity, a group of humans, and/or a group including a legal and a natural person or entity.

The communication device 200 can also include an application integration component (AIC) (not shown). In some embodiments, the AIC can include software and/or hardware configured to integrate one or more applications at an individual level or at a group level. Integrating one or more applications at an individual level can include retrieving and/or providing information specific to an individual. Integrating one or more applications at a group-level can include retrieving and/or providing information specific to a group or individuals of, or members of, the group. For example, the AIC can provide messaging, contacts and/or social media information about a specific individual or for a specific group or for specific members of a group.

In these embodiments, the AIC can enable the communication device 200 to be individual-targeted or group-targeted in provisioning of contact, messaging and/or social media information without requiring a user of the apparatus to enter individual applications for each of the contact, messaging and/or social media information.

As such, while the messaging component 218, contacts component 216 and the social media component 220 can allow the user of the communication device 200 to view messaging, contacts and social media information about one or more individuals or groups on a single display region of the UI, when the AIC integrates the messaging, contacts and/or social media application, the AIC can do such integration at an individual or group level. As such, upon integration, the messaging, contacts and/or social media information can be targeted towards a single individual and/or a single group. The targeted information can be information that displays details specific to or about the individual and/or group. Such targeted information can be displayed by UI.

The communication device 200 also can include a processor 206. The processor 206 can enable the communication device 200 to process data relating to securing the communication device 200 and information associated therewith, displaying information on the UI, generating or displaying an overlay display region, generating or processing notifications and associated notification-related information, and the like. In some embodiments, the processor 206 can be configured to execute computer-executable instructions to perform one or more of the functions described herein for the communication device 200, and the memory 208 can store the computer-executable instructions and/or information for performing the operations described herein.

In various embodiments, the processor 206 can be configured to confer functionality, at least in part, to substantially any component within the communication device 200, in accordance with aspects of the subject innovation. As another example, the processor 206 can facilitate enabling the communication device 200 to process data (e.g., symbols, bits, or chips) for multiplexing/demultiplexing, modulation/demodulation, such as implementing direct and inverse fast Fourier transforms, selection of modulation rates, selection of data packet formats, inter-packet times, and the like.

While the embodiments described herein are described with reference to a combination of two or more components, in various embodiments, one or more of the functions or structure (or part thereof) associated with the two or more components of the communication devices 102, 200 can be performed or provided in the security component 204, respectively. Additionally, steps associated with various methods described herein that can be described with reference to different components or applications can be performed by a single component or application. Finally, multiple steps can be combined and performed in a single step, single steps can be performed as multiple steps, and steps described as being performed in sequence or parallel can be performed partly or completely in parallel or sequence, respectively.

Figure 11:
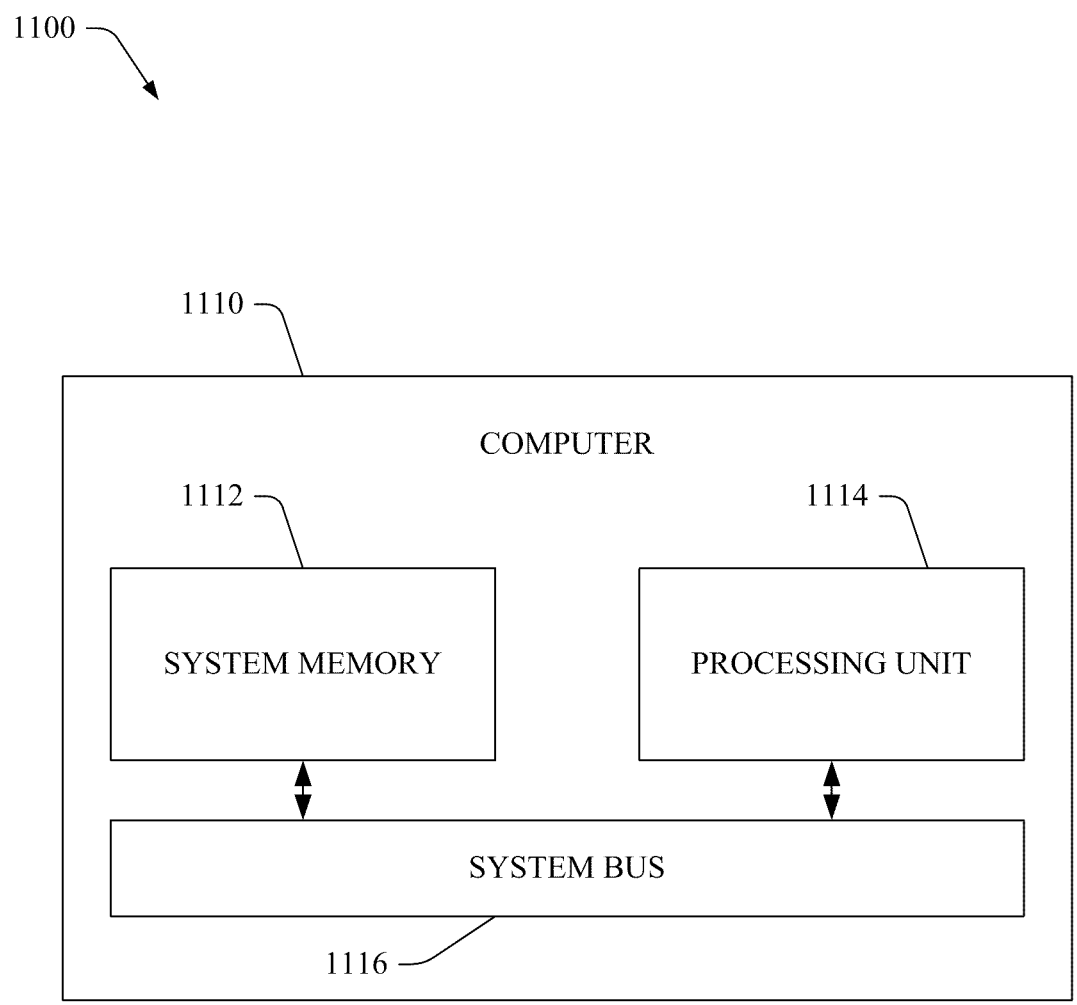
FIG. 11 illustrates an exemplary operating environment facilitating the systems, apparatus, methods and computer-readable storage media described herein.

FIG. 11 illustrates an exemplary operating environment that facilitates the systems, apparatus, methods and computer-readable storage media described herein. In order to provide additional context for various aspects of the embodiments described herein, FIG. 11 and the following discussion are intended to provide a brief, general description of a computing environment 1100 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available media that can be accessed by a computing device and includes both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read-only memory (ROM), random access memory (RAM), Electrically Erasable Programmable Read-Only Memory (EEPROM), flash memory or other memory technology, compact disc read-only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communication media can embody computer-readable instructions, data structures, program modules and/or other structured or unstructured data in a data signal such as a modulated data signal, e.g., a carrier wave or other transport mechanism, and includes any information delivery or transport media. The term "modulated data signal" or "modulated data signals" refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media. Combinations of any of the above can also be included within the scope of communication media. In some embodiments, communication media are capable of subsequently propagating through electrically conductive media, (e.g., such as a system bus, microprocessor, data port, and the like) and/or non-electrically conductive media (e.g., in the form of radio frequency microwave frequency, optical frequency and similar electromagnetic frequency modulated data signals).

In accordance with various aspects, the computing environment 1100 for implementing various aspects includes a computer 1110, the computer 1110 including a processing unit 1114, a system memory 1112 and a system bus 1116. The system bus 1116 couples system components including, but not limited to, the system memory 1112 to the processing unit 1114. The processing unit 1114 can be any of various commercially available processors, such a single core processor, a multi-core processor, or any other suitable arrangement of processors. The system bus 1116 can be any of several types of bus structure that can further interconnect to a memory bus (with or without a memory controller), a peripheral bus, and a local bus using any of a variety of commercially available bus architectures. The system memory 1112 can include ROM, random access memory RAM, high-speed RAM (such as static RAM), erasable programmable read only memory (EPROM), EEPROM, flash memory, and/or the like. Additionally or alternatively, the computer 1102 can include a hard disk drive, upon which program instructions, data, and the like can be retained. Moreover, removable data storage can be associated with the computer 1110. Hard disk drives, removable media, computer-readable storage media, etc. can be communicatively coupled to the processing unit 1114 by way of the system bus 1116.

The system memory 1112 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1110 through one or more wired/wireless input devices, such as a keyboard, pointing and clicking mechanism, pressure sensitive screen, microphone, joystick, stylus pen, etc. A monitor or other type of interface can also be connected to the system bus 1116.

The computer 1110 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1110 can connect to other devices/networks by way of antenna, port, network interface adaptor, wireless access point, modem, and/or the like.

The computer 1110 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and BLUETOOTH® wireless technologies. Thus, the communication can be a predefined structure as with a conventional network or simply an ad hoc communication between at least two devices.

WiFi allows connection to the Internet from a desired location (e.g., couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
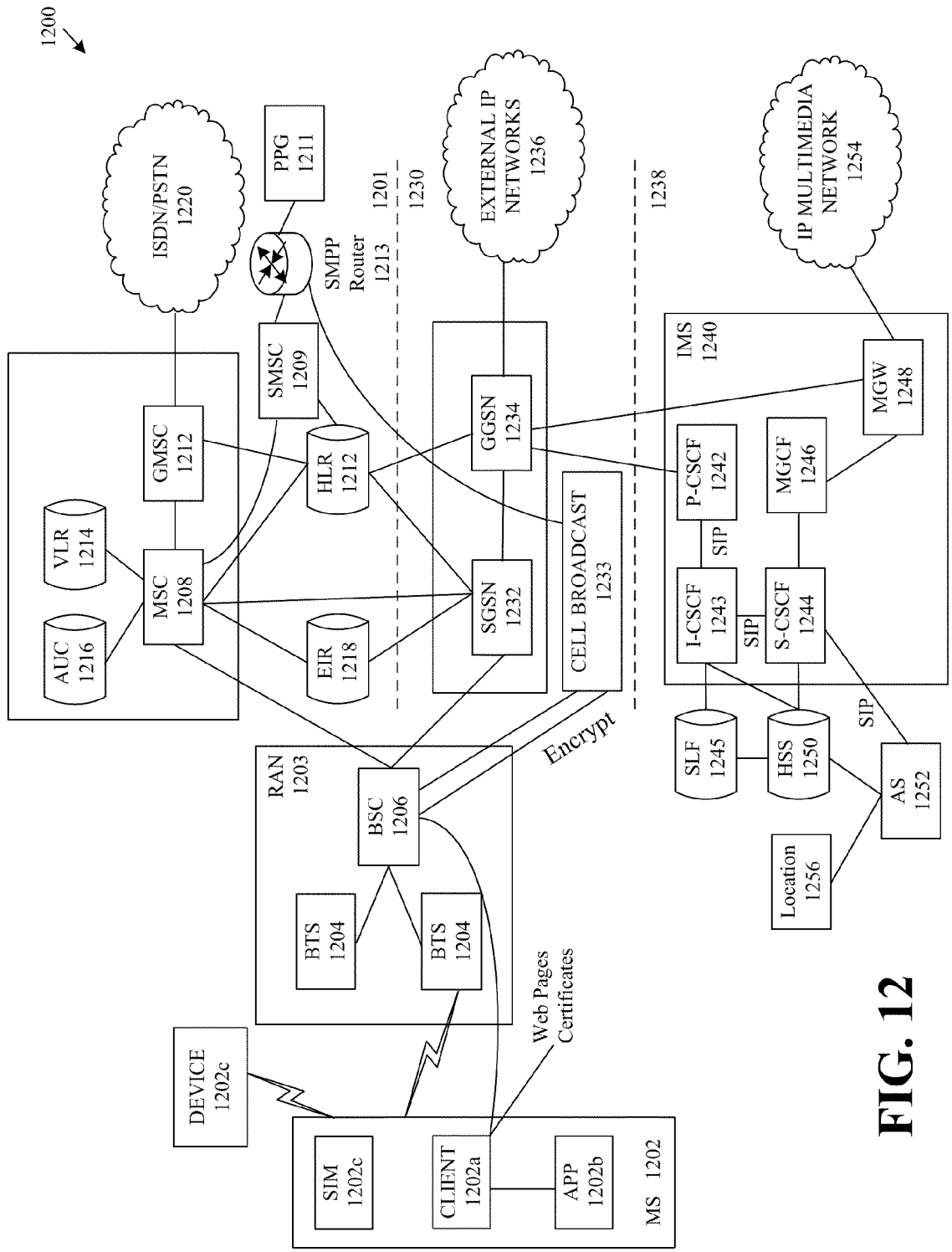
FIG. 12 illustrates an exemplary network environment facilitating the systems, apparatus, methods and computer-readable storage media described herein.

FIG. 12 illustrates an exemplary network environment that facilitates the systems, apparatus, methods and computer-readable storage media described herein. FIG. 12 depicts a GSM/General packet radio service (GPRS)/IP multimedia network architecture 1200 that includes a GSM core network 1201, a GPRS network 1230 and an IP multimedia network 1238. The GSM core network 1201 includes a Mobile Station (MS) 1202, at least one Base Transceiver Station (BTS) 1204 and a Base Station Controller (BSC) 1206. The MS 1202 is physical equipment or Mobile Equipment (ME), such as a mobile phone or a laptop computer that is used by mobile subscribers, with a Subscriber identity Module (SIM) 1202c. The SIM 1202c includes an International Mobile Subscriber Identity (IMSI), which is a unique device identifier of a subscriber. The MS 1202 includes an embedded client 1202a that receives and processes messages received by the MS 1202. The embedded client 1202a can be implemented in JAVA and is discuss more fully below.

The embedded client 1202a communicates with an application (APP) 1202b that provides services and/or information to an end user. One example of the application can be navigation software that provides near real-time traffic information that is received via the embedded client 1202a to the end user. The navigation software can provide road conditions, suggest alternate routes, etc., based at least in part on the location of the MS 1202. Those of ordinary skill in the art understand that there are many different methods and systems of locating an MS 1202.

Alternatively, the MS 1202 and a device 1202c can be enabled to communicate via a short-range wireless communication link, such as BLUETOOTH® technologies. For example, a BLUETOOTH® SIM Access Profile can be provided in an automobile (e.g., device 1202c) that communicates with the SIM 1202c in the MS 1202 to enable the automobile's communications system to pull information from the MS 1202. The BLUETOOTH® communication system in the vehicle becomes an "embedded phone" that employs an antenna associated with the automobile. The result is improved reception of calls made in the vehicle. As one of ordinary skill in the art would recognize, an automobile is one example of the device 1202c. There can be an endless number of devices 1202c that use the SIM within the MS 1202 to provide services, information, data, audio, video, etc. to end users.

The BTS 1204 is physical equipment, such as a radio tower, that enables a radio interface to communicate with the MS. Each BTS can serve more than one MS. The BSC 1206 manages radio resources, including the BTS. The BSC can be connected to several BTSs. The BSC and BTS components, in combination, are generally referred to as a base station (BSS) or radio access network (RAN) 1203.

The GSM core network 1201 also includes a Mobile Switching Center (MSC) 1208, a Gateway Mobile Switching Center (GMSC) 1210, a Home Location Register (HLR) 1212, Visitor Location Register (VLR) 1214, an Authentication Center (AuC) 1218, and an Equipment Identity Register (EIR) 1216. The MSC 1208 performs a switching function for the network. The MSC also performs other functions, such as registration, authentication, location updating, handovers, and call routing. The GMSC 1210 provides a gateway between the GSM network and other networks, such as an Integrated Services Digital Network (ISDN) or Public Switched Telephone Networks (PSTNs) 1220. In other words, the GMSC 1210 provides interworking functionality with external networks.

The HLR 1212 is a database or component(s) that comprises administrative information regarding each subscriber registered in a corresponding GSM network. The HLR 1212 also includes the current location of each MS. The VLR 1214 is a database or component(s) that contains selected administrative information from the HLR 1212. The VLR contains information necessary for call control and provision of subscribed services for each MS currently located in a geographical area controlled by the VLR. The HLR 1212 and the VLR 1214, together with the MSC 1208, provide the call routing and roaming capabilities of GSM. The AuC 1216 provides the parameters needed for authentication and encryption functions. Such parameters allow verification of a subscriber's identity. The EIR 1218 stores security-sensitive information about the mobile equipment.

A Short Message Service Center (SMSC) 1209 allows one-to-one Short Message Service (SMS) messages to be sent to/from the MS 1202. A Push Proxy Gateway (PPG) 1212 is used to "push" (e.g., send without a synchronous request) content to the MS 1202. The PPG 1211 acts as a proxy between wired and wireless networks to facilitate pushing of data to the MS 1202. A Short Message Peer to Peer (SMPP) protocol router 1213 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1202 sends a location update including its current location information to the MSC/VLR, via the BTS 1204 and the BSC 1206. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1230 is logically implemented on the GSM core network architecture by introducing two packet-switching network nodes, a serving GPRS support node (SGSN) 1232, a cell broadcast and a Gateway GPRS support node (GGSN) 1234. The SGSN 1232 is at the same hierarchical level as the MSC 1208 in the GSM network. The SGSN controls the connection between the GPRS network and the MS 1202. The SGSN also keeps track of individual MS's locations and security functions and access controls.

A Cell Broadcast Center (CBC) 1233 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1234 provides a gateway between the GPRS network and a public packet network (PDN) or other IP networks 1236. In embodiments, the GGSN provides interworking functionality with external networks, and sets up a logical link to the MS through the SGSN. When packet-switched data leaves the GPRS network, it is transferred to an external Transmission Control Protocol (TCP)-IP network 1236, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1230 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (e.g., voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vice versa.

The IP multimedia network 1238 was introduced with 3GPP Release 5, and includes an IP multimedia subsystem (IMS) 1240 to provide rich multimedia services to end users. A representative set of the network entities within the IMS 1240 are a call/session control function (CSCF), a media gateway control function (MGCF) 1246, a media gateway (MGW) 1248, and a master subscriber database, called a home subscriber server (HSS) 1250. The HSS 1250 can be common to the GSM network 1201, the GPRS network 1230 as well as the IP multimedia network 1238.

The IP multimedia system 1240 is built around the call/session control function (CSCF), of which there are three types: an interrogating CSCF (I-CSCF) 1243, a proxy CSCF (P-CSCF) 1242, and a serving CSCF (S-CSCF) 1244. The P-CSCF 1242 is the MS's first point of contact with the IMS 1240. The P-CSCF 1242 forwards session initiation protocol (SIP) messages received from the MS to an SIP server in a home network (and vice versa) of the MS. The P-CSCF 1242 can also modify an outgoing request according to a set of rules defined by the network operator (e.g., address analysis and potential modification).

The I-CSCF 1243 forms an entrance to a home network and hides the inner topology of the home network from other networks and provides flexibility for selecting an S-CSCF. The I-CSCF 1243 can contact a subscriber location function (SLF) 1245 to determine which HSS 1250 to use for the particular subscriber, if multiple HSS 1250 are present. The S-CSCF 1244 performs the session control services for the MS 1202. This includes routing originating sessions to external networks and routing terminating sessions to visited networks. The S-CSCF 1244 also decides whether an application server (AS) 1252 is required to receive information on an incoming SIP session request to ensure appropriate service handling. This decision is based on information received from the HSS 1250 (or other sources, such as an application server 1252). The AS 1252 also communicates to a location server 1256 (e.g., a Gateway Mobile Location Center (GMLC)) that provides a position (e.g., latitude/longitude coordinates) of the MS 1202.

The HSS 1250 contains a subscriber profile and keeps track of which core network node is currently handling the subscriber. It also supports subscriber authentication and authorization functions (AAA). In networks with more than one HSS 1250, a subscriber location function provides information on the HSS 1250 that contains the profile of a given subscriber.

The MGCF 1246 provides interworking functionality between SIP session control signaling from the IMS 1240 and ISDN User Part (ISUP)/Bearer Independent Call Control (BICC) call control signaling from the external GSTN networks (not shown). It also controls the media gateway (MGW) 1248 that provides user-plane interworking functionality (e.g., converting between Adaptive Multi-Rate (AMR)- and Pulse-code modulation (PCM)-coded voice). The MGW 1248 also communicates with other IP multimedia networks 1254.

In some embodiments, the IP networks 1236 described herein include networks communicatively coupled to social networking sites. As such, the networks disclosed herein can also include such IP networks 1236 and one or more social networking sites.

It is to be appreciated and understood that components (e.g., UE, AP, core network, security component, UI, overlay component, etc.), as described with regard to a particular system or methodology, can include the same or similar functionality as respective components (e.g., respectively named components, similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "data store," data storage," "database," "repository", and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include ROM, programmable ROM (PROM), EPROM, EEPROM, phase change memory (PCM), flash memory, or nonvolatile RAM (e.g., ferroelectric RAM (FeRAM)). Volatile memory can include RAM, which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "interface," "module," and the like can refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. As another example, an interface can include input/output (I/O) components as well as associated processor, application and/or API components, and can be as simple as a command line or as complex as an Integrated Development Environment (IDE). Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Furthermore, the embodiments can or can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), DVD, Blu-ray disc (BD), . . . ), smart cards, and/or flash memory devices (e.g., card, stick, key drive). Additionally it should be appreciated that a carrier wave can carry computer-readable electronic data (e.g., the data transmitted and received via email and/or to access the Internet or a network such as a LAN). As known to those of ordinary skill in the art, modifications can be made to the above embodiments without departing from the spirit of the disclosure.

Moreover, the word "exemplary" is used herein to mean an example, instance or illustration. Any aspect or design described herein as "exemplary" is not to be construed as preferred or advantageous over other aspects or designs. Rather, use of the word "exemplary" is merely intended to present examples of embodiments. Further, as used herein, the term "or" is intended to mean an inclusive "or" rather than an exclusive "or". That is, unless specified otherwise, or clear from context, "X employs A or B" is intended to mean any of the inclusive permutations (e.g., X employs A, X employs B, X employs A and B). In addition, the articles "a" and "an," as used herein, should be construed to mean "one or more" unless, as specified otherwise, or clear from context, the articles are directed to only a singular form.

As used herein, the terms "infer" or "inference" refer generally to the process of reasoning about or inferring states of the system, apparatus, method, environment, and/or user from a set of observations as captured via events and/or data. By way of examples, but not limitation, inference can be employed to identify a specific context or action, or can generate a probability distribution over states. The inference can be probabilistic (e.g., the computation of a probability distribution over states of interest based on a consideration of data and events). Inference can also refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources.

What has been described above includes embodiments of claimed subject matter. It is, of course, not possible to describe every conceivable combination of components or methodologies for purposes of describing the claimed subject matter. However, one of ordinary skill in the art can recognize that many further combinations and permutations of such subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   executing, by a device comprising a processor, a first level security application associated with a first level of security on the device based, at least, on detecting that the first level of security is enabled for the device and detecting execution of a second level security application associated with a second level of security, wherein the first level is a higher level of security than the second level, and wherein the detecting the execution of the second level security application is based on detection of a swipe gesture from a second region associated with a locked state of a user interface to a first region associated with an unlocked state of the user interface;
   detecting, by the device, an entry at the user interface of the device;
   determining, by the device, whether the entry corresponds to security access information stored by the device;
   facilitating, by the device, access to the first level security application associated with the first level of security based, at least, on the determining indicating that the entry corresponds to the security access information; and
   facilitating, by the device, displaying, as an overlay relative to information displayed via the user interface, notification information about an incoming call, wherein a level of detail of the notification information is based on whether the first level of security or the second level of security is enabled for the device, and
      wherein a first level of detail about the incoming call is displayed, as the overlay on the information displayed via the user interface, concurrent with receipt of the incoming call, wherein the first level of detail is displayed based on detection of previous execution of the first level of security,
      wherein a second level of detail about the incoming call is displayed, as the overlay on the information displayed via the user interface, concurrent with receipt of the incoming call, and wherein the second level of detail is displayed based on detection of previous execution of the second level of security.

2. The method of claim 1, wherein the detecting the entry comprises detecting the entry at a substantially hexagonally-shaped keypad.

3. The method of claim 1, wherein the execution of the second level security application comprises:
   facilitating, by the device via the user interface, displaying the first region and the second region; and
   unlocking, by the device, the user interface of the communication device based, at least, on detecting the swipe gesture from the second region to the first region, wherein the detecting is performed while the device in the locked state.

4. The method of claim 1, wherein the executing the first level security application is further based on detecting a device event, wherein the device event comprises movement of a physical keypad associated with the device from a first location relative to the user interface to a second location relative to the user interface.

5. The method of claim 1, further comprising providing limited access to the device based, at least, on the determining indicating that the entry does not correspond to the security access information, wherein the limited access comprises capabilities for initiating emergency calls and displaying information associated with a defined emergency.

6. The method of claim 1, further comprising:
   determining, by the device, a number of times that entries that do not correspond to the security access information have been detected at the device; and
   initiating, by the device, a timeout state of the device in which no access to the device is provided, based, at least, on determining that the number of times exceeds a defined number of times that attempted access has been detected by the device.

7. An apparatus, comprising:
   a memory to store executable instructions; and
   a processor, coupled to the memory, that facilitates execution of the executable instructions to perform operations, comprising:
      detecting whether a first level of security is enabled for the apparatus;
      executing a first level security application associated with the first level of security on the apparatus based, at least, on detection that the first level security is enabled for the apparatus and execution, at the apparatus, of a second level security application associated with a second level of security, wherein the execution of the second level security application is performed in response to unlocking a user interface of the apparatus based on detection of a swipe gesture from a first region of the user interface to a second region of the user interface;
      receiving a signal indicative of detection of an entry at the apparatus;
      determining whether the entry corresponds to security access information accessible by the apparatus;
      providing access to the first level security application based, at least, on determining that the entry corresponds to the security access information, wherein the first level is a higher level of security than the second level; and
      initiating display of notification information about an incoming message as an overlay over information displayed via the user interface, wherein a level of detail of the notification information about the incoming message is based on whether the first level of security or the second level of security is activated for the device, wherein a first amount of detail about the incoming message is displayed, as the overlay over the information displayed via the user interface, during receipt of the incoming message, wherein the first amount of detail about the incoming message is displayed based on detection of prior execution of the first level of security, and wherein a second amount of detail about the incoming message is displayed, as the overlay over the information displayed via the user interface, during receipt of the incoming message, and wherein the second amount of detail about the incoming message is displayed based on detection of prior execution of the second level of security.

8. The apparatus of claim 7, wherein the operations further comprise:
facilitating displaying first level security application information associated with the first level security application, wherein the first level security application information comprises an image of a keypad having an outer perimeter that is substantially hexagonally-shaped and comprising numeric information.

9. The apparatus of claim 8, wherein the first level security application information further comprises status information comprising a first icon configured to display a first image based, at least, on the unlocking the apparatus, and a second image prior to the unlocking the apparatus.

10. The apparatus of claim 7, wherein the user interface is configured to display second level security information prior to displaying a keypad associated with the first level security application,
wherein the second level security information comprises a display including the first region associated with an unlocked state of the user interface and the second region associated with a locked state of the user interface,
wherein the security component is further configured to execute the second level security application prior to the executing the first level security application, and
wherein the security component is configured to perform the unlocking of the user interface based, at least, on receiving a signal indicative of the user interface detecting an input gesture at the first region.

11. The apparatus of claim 7, wherein the executing the first level security application is based on detecting a communication device event, wherein the communication device event comprises initiation of a boot sequence associated with the apparatus.

12. The apparatus of claim 7, wherein the operations further comprise providing limited access to the apparatus based, at least, on determining that the entry does not correspond to the security access information, wherein the limited access comprises access to initiation of emergency calls and display of emergency information.

13. The apparatus of claim 7, wherein the operations further comprise:
determining a number of times that entries that do not correspond to the security access information have been detected at the user interface; and
initiating a timeout state of the apparatus in which no access to the apparatus is provided, based, at least, on determining that the number of times exceeds a defined number of times that attempted access has been detected by the apparatus.

14. A computer-readable storage medium storing computer-executable instructions that, in response to execution, cause a device comprising a processor to perform operations, comprising:
detecting whether a first level of security is enabled for the device;
displaying, via a user interface, first level security application information associated with a first level security application associated with the first level of security;
executing the first level security application on the device based, at least, on detecting that the first level of security is enabled for the device and execution of a second level security application associated with a second level of security at the device, wherein the first level is a higher level of security than the second level, and wherein the execution of the second level security application is based on detection of a swipe gesture from a first region of the user interface to a second region of the user interface; and
facilitating displaying as an overlay relative to information displayed via the user interface, notification information about an incoming call, wherein a level of detail of the notification information is based on whether the first level of security or the second level of security is enabled for the device, wherein a first level of detail about the incoming call is displayed, as the overlay on the information displayed via the user interface, during receipt of the incoming call, wherein the first level of detail is displayed based on detection of previous execution of the first level of security, wherein a second level of detail about the incoming call is displayed, as the overlay on the information displayed via the user interface, during receipt of the incoming call, and wherein the second level of detail is displayed based on detection of previous execution of the second level of security.

15. The computer-readable storage medium of claim 14, wherein the operations further comprise:
receiving a signal indicative of an entry at the device;
determining whether the entry corresponds to security access information accessible by the device; and
unlocking the device based, at least, on determining that the entry corresponds to the security access information.

16. The computer-readable storage medium of claim 14, wherein the first level security application information associated with the first level security application comprises an image of a keypad having an outer perimeter that is substantially hexagonally-shaped and comprising numeric information.

17. The computer-readable storage medium of claim 15, wherein the first level security application information further comprises status information comprising a first icon configured to display a first image based, at least, on the unlocking the device, and configured to display a second image prior to the unlocking the device.

18. The computer-readable storage medium of claim 14, wherein the first level security application information is first information, and the operations further comprise:
executing the second level security application prior to the executing the first level security application;
displaying, via the user interface, second information associated with the second level security application prior to displaying the first information associated with the first level security application, wherein the second information comprises display information including a first region associated with an unlocked state of the user interface and a second region associated with a locked state of the user interface; and
unlocking the user interface based, at least, on detecting a signal indicative of receipt of an input gesture at the first region of the user interface.

19. The computer-readable storage medium of claim 14, wherein the executing the first level security application on the device is based, at least, on detecting that a device event has occurred, wherein the device event comprises initiation of a boot sequence associated with the device.

20. The computer-readable storage medium of claim 14, wherein the operations further comprise:

providing limited access to the device based, at least, on determining that an entry received by the device does not correspond to the security access information, wherein the limited access comprises privileges relating to initiation of emergency calls and display of emergency information.

\* \* \* \* \*